US009277129B2

(12) United States Patent
Klivington et al.

(10) Patent No.: US 9,277,129 B2
(45) Date of Patent: Mar. 1, 2016

(54) ROBUST IMAGE FEATURE BASED VIDEO STABILIZATION AND SMOOTHING

(71) Applicant: Apple Inc., Cupertino, CA (US)

(72) Inventors: Jason Klivington, Portland, OR (US); Rudolph van der Merwe, Portland, OR (US)

(73) Assignee: APPLE INC., Cupertino, CA (US)

( * ) Notice: Subject to any disclaimer, the term of this patent is extended or adjusted under 35 U.S.C. 154(b) by 287 days.

(21) Appl. No.: 14/049,118

(22) Filed: Oct. 8, 2013

(65) Prior Publication Data

US 2014/0362240 A1 Dec. 11, 2014

Related U.S. Application Data

(60) Provisional application No. 61/832,750, filed on Jun. 7, 2013.

(51) Int. Cl.
*H04N 5/232* (2006.01)
*G06T 5/00* (2006.01)
*G06T 5/50* (2006.01)
*G06T 7/20* (2006.01)

(52) U.S. Cl.
CPC ............ *H04N 5/23267* (2013.01); *G06T 5/003* (2013.01); *G06T 5/50* (2013.01); *G06T 7/204* (2013.01); *H04N 5/23254* (2013.01)

(58) Field of Classification Search
None
See application file for complete search history.

(56) References Cited

U.S. PATENT DOCUMENTS

2012/0154579 A1* 6/2012 Hampapur ............ G06T 7/2006
348/143
2012/0281922 A1* 11/2012 Yamada ............. H04N 5/23254
382/201

* cited by examiner

*Primary Examiner* — Twyler Haskins
*Assistant Examiner* — Angel L Garces-Rivera
(74) *Attorney, Agent, or Firm* — Adeli LLP

(57) ABSTRACT

A method of removing unwanted camera motion from a video sequence is provided. The method matches a group of feature points between each pair of consecutive video frames in the video sequence. The method calculates the motion of each matched feature point between the corresponding pair of consecutive video frames. The method calculates a set of historical metrics for each feature point. The method, for each pair of consecutive video frames, identifies a homography that defines a dominant motion between the pair of consecutive frames. The homography is identified by performing a geometrically biased historically weighted RANSAC on the calculated motion of the feature points. The geometrically biased historically weighted RANSAC gives a weight to the calculated motion of each feature point based on the historical metrics calculated for the feature point. The method removes the unwanted camera motion from the video sequence using the identified homographies.

25 Claims, 27 Drawing Sheets

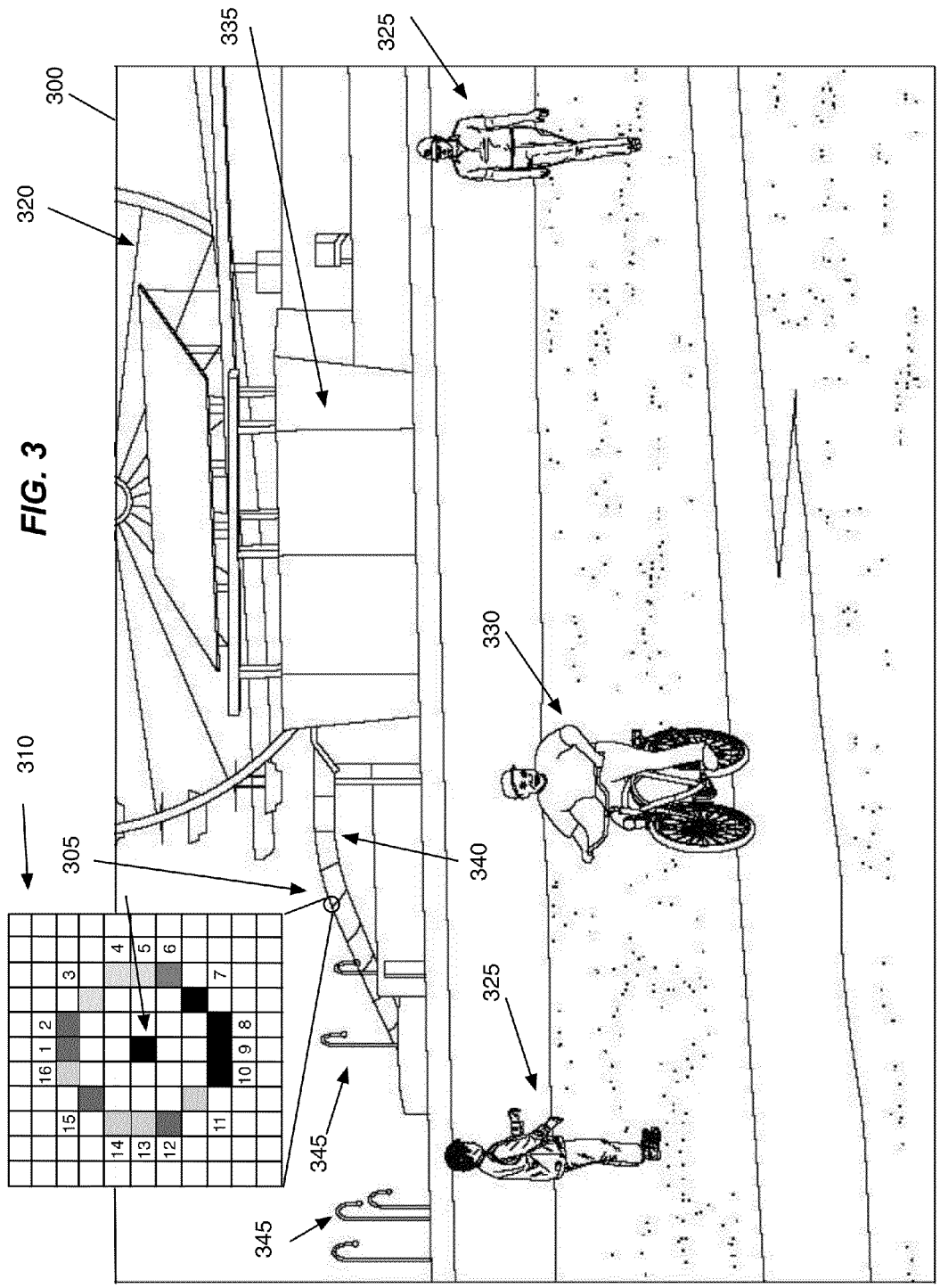

ROBUST IMAGE FEATURE BASED VIDEO STABILIZATION AND SMOOTHING

CLAIM OF BENEFIT TO PRIOR APPLICATIONS

The present Application claims the benefit of U.S. Provisional Patent Application 61/832,750, entitled, "Robust Image Feature Based Video Stabilization and Smoothing," filed Jun. 7, 2013. The content of U.S. Provisional application 61/832,750 is hereby incorporated by reference.

BACKGROUND

A broad range of video equipment from cameras in smart phone to video equipment for large production studios is available to individuals and businesses. The video footage recorded by video equipment often appear wobbly due to unwanted motion of objects in the recorded video due to e.g., unintended shaking of the camera, rolling shutter effect, etc.

Different techniques are used to stabilize a video sequence and remove unwanted camera movements. The objective of motion stabilization is to remove the jitter produced by handheld devices. Camera jitter introduces extraneous motion that is not related to the actual motion of objects in the picture. Therefore, the motion appears as random picture movements that produce disturbing visual effects.

Image stabilization methods have been developed in the past that model the camera motion and distinguish between the intended and unintended motions. Other methods have also been developed that generate a set of curves to track different camera movements such as translation, rotation, and zoom. The curves are smoothed and the differences between the unsmoothed curves and the smoothed curves are used to define a set of transformations to apply to each video image to remove the unwanted camera motion.

BRIEF SUMMARY

Some embodiments provide a method for homography-based video stabilization and smoothing. During the analysis phase, the method analyzes a video sequence and determines homographies between each pair of consecutive frames that captures the dominant motion of the video sequence. In order to facilitate these homography calculations, the method in some embodiments first identifies the points of interest, referred to as robust image feature points, within each frame. Each identified feature point is then described in terms of one or more parameters of a group of neighboring points. The method then matches the feature points between each frame and the previous frame in the sequence. Other embodiments use different methods such as optical flow to match points between frames.

Once the matches are identified, the method uses a novel enhancement of the Random Sample Consensus (RANSAC) algorithm, referred to herein as Geometrically Biased Historically Weighted RANSAC (or weighted RANSAC for brevity), to identify homographies between each pair of consecutive frames describing the spatial transformation of feature points associated with the dominant motion between the frames.

Prior to the application of weighted RANSAC algorithm, some embodiments apply a non-maximum suppression algorithm to the set of feature matches to reduce the density of feature matches in areas of high concentration. The result is a more uniform distribution of matched feature points across the entire image, rather than having dense clusters of feature points in areas of high detail. This allows the subsequent application of the weighted RANSAC algorithm to produce a more spatially uniform consensus of motion.

The method maintains historical metrics for each feature point that indicate in how many previous frames the feature point has been tracked, in how many of the previous frames the feature point was an inlier that contributed to the dominant motion of the video sequence, and how much the feature point has moved from the dominant field of motion.

The method utilizes the historical metrics to perform the weighted RANSAC with a cost function associated with each point, where inclusion of prior inliers (particularly those with long history of being inlier) is weighted heavily and the feature points that have long been major outliers are weighted lightly, or in some embodiments negatively. The algorithm also incorporates a geometric component in the weighted RANSAC cost function that biases solutions towards solutions that have minimal spatial distortion. The weighted RANSAC is utilized in to provide a homography that describes the motion from frame N−1 to frame N.

During the smoothing and stabilization phase, the method in some embodiments utilizes the homographies and finds smoothing homographies that are applied to the video frames to stabilize the sequence of video frames. The homographies are utilized to determine the reprojected position of each corner of each video frame and subsequently calculate the differences or "deltas" between the original corner frame positions and their reprojected positions based on the homography calculated from the dominant motion between the consecutive frames.

The method then applies a smoothing function to the sequence deltas for each of the identified four corners. Some embodiments apply a Gaussian kernel to perform the smoothing operation. The method then determines the difference between the smoothed corner deltas and the original deltas. The differences are utilized to generate homographies that are applied to the original video frames to produce the smooth video sequence. The method calculates the difference between the smooth and noisy corners. The method has the smooth trajectory through the time as well as the noisy trajectory through the time. The method calculates the difference between the smooth and the current trajectory for each corner. The differences are then used to find the corrective homography that is applied in order to get each frame to the smooth trajectory.

Some embodiments provide a tripod mode to completely eliminate the dominant motion of the video sequence as if the camera was on a tripod. The method selects a key frame (e.g., the original frame or a frame that has most of the relevant subject matter, etc.) in the video sequence, calculates the difference between all corners for any other frame and the corresponding corners of the key frame. The differences are then used to map all frames to the key frame homography to delete all the motion related to the dominant motion of the video sequence.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 3 conceptually illustrates identifying a point of interest using FAST algorithm in some embodiments of the invention.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
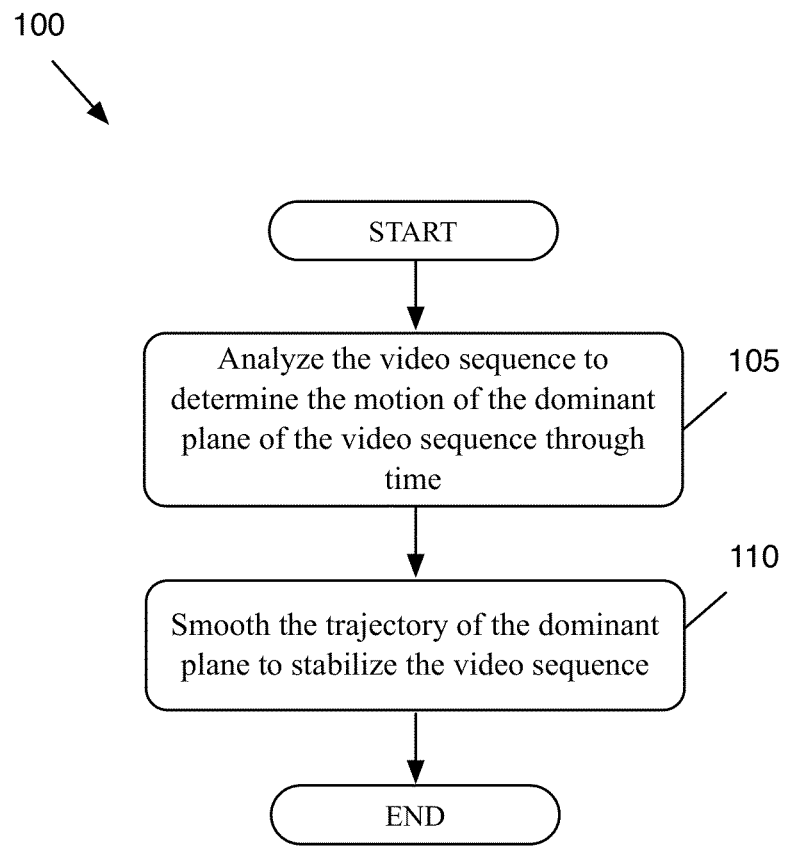
FIG. 1 conceptually illustrates the high-level process utilized to stabilize a sequence of video frames in some embodiments of the invention.

Some embodiments provide a system and method for removing unwanted motion and stabilizing a video sequence. FIG. 1 conceptually illustrates a high-level process 100 utilized to stabilize a sequence of video frames (also referred to as video pictures or video images) in some embodiments of the invention. The process includes an analysis phase and a stabilization phase. As shown, the process initially analyzes (at 105) the video sequence to identify motion of features between video frames and determines a dominant motion in the sequence.

During the analysis phase, the process determines the relevant structure between frames and utilizes it to determine the inter-frame homography that describes the dominant motion. The dominant motion is the motion of the dominant plane of the video sequence through time. The process excludes and ignores transient objects that move through the frame when calculating the inter-frame transformation of the dominant plane.

Once the dominant motion in the video sequence is identified, the process smooths (at 110) the effects of the unwanted motion to stabilize the video sequence. The space-time motion trajectory of the dominant plane identified in analysis phase includes both the wanted major motions such as pans, zooms, etc., as well as the unwanted high frequency motion such as camera shake, vibrations, etc. During the stabilization phase, the process removes this unwanted component through low-pass smoothing of the noisy trajectory. The amount of smoothing applied in some embodiments is a user specified parameter.

Several more detailed embodiments of the invention are described in sections below. Section I discusses analysis of a video sequence. Next, Section II describes stabilization of the video sequence. Finally, section III provides a description of a computer system with which some embodiments of the invention are implemented.

I. Video Sequence Analysis

Figure 2A:
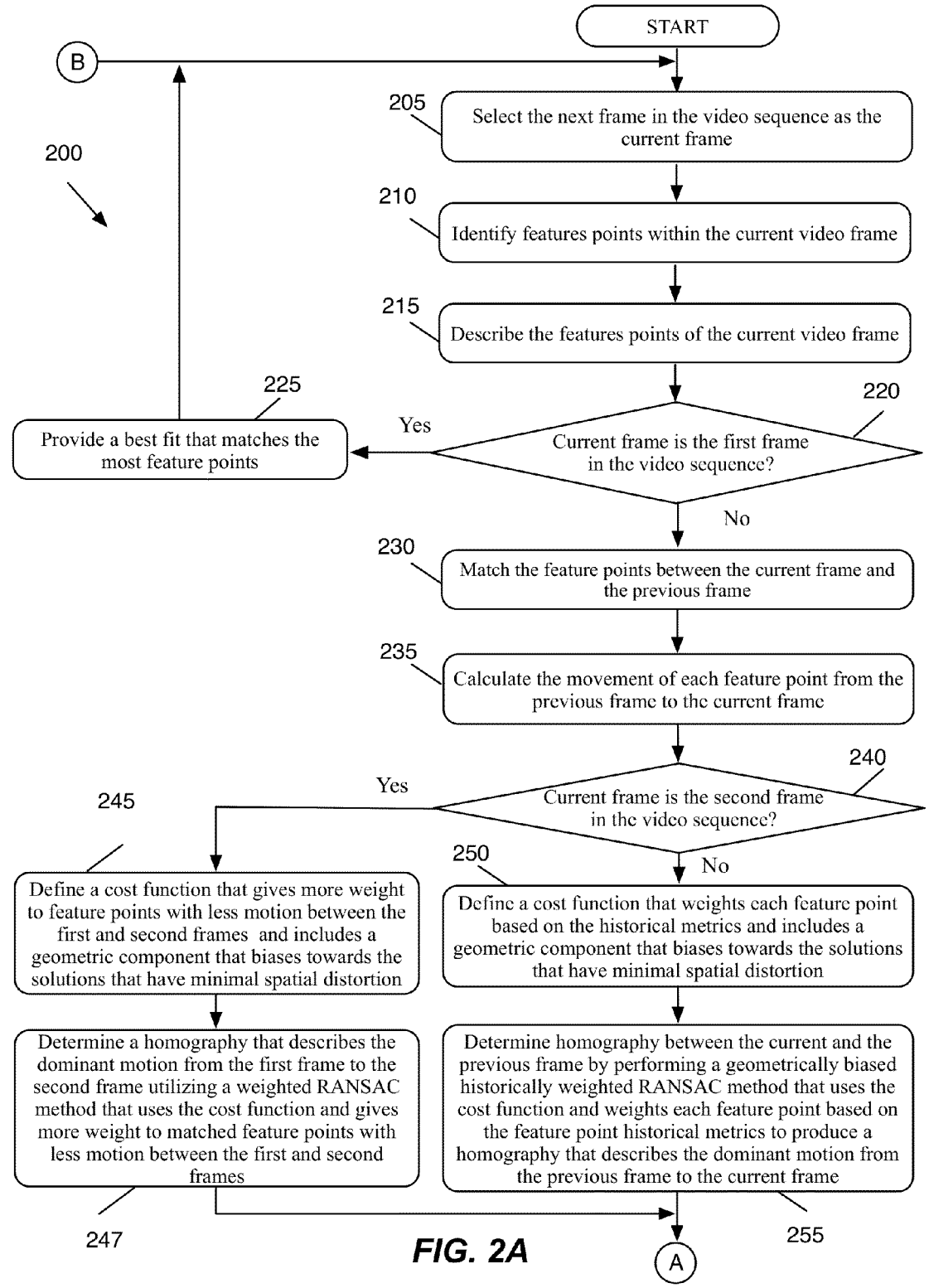
FIGS. 2A-2B conceptually illustrate a process for analyzing a video sequence to identify dominant motion in some embodiments of the invention.
Figure 2B:
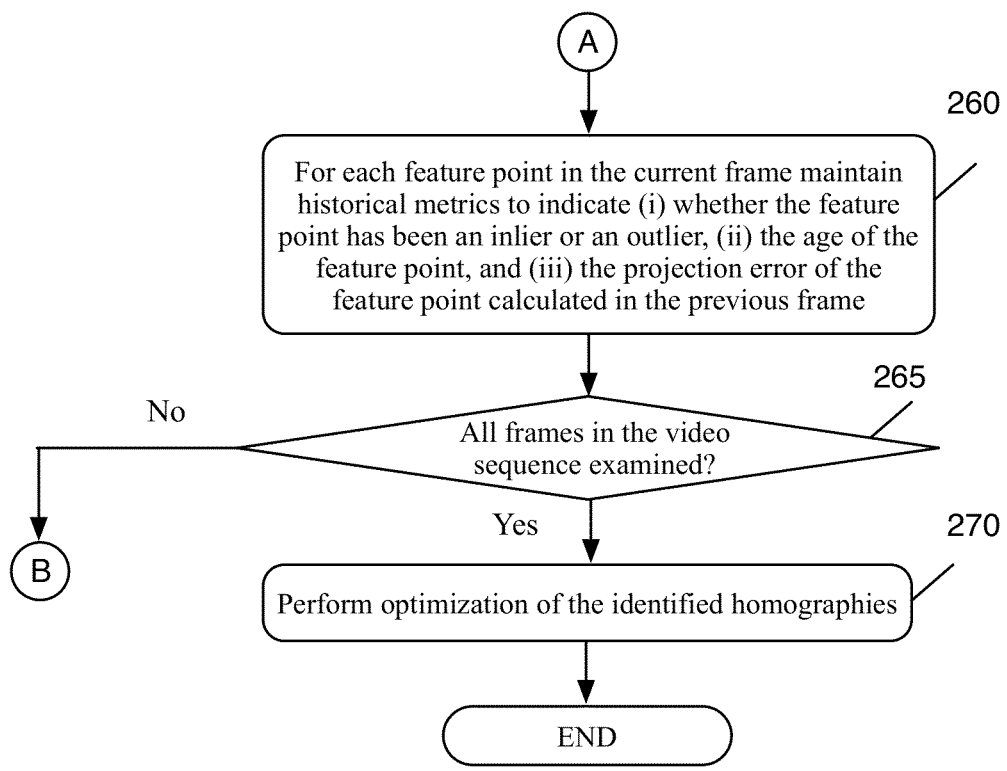

FIGS. 2A-2B conceptually illustrate a process 200 for analyzing a video sequence to identify dominant motion in some embodiments of the invention. Starting with the first video frame, the process selects (at 205) the next frame in the video sequence as the current frame. The process then identifies (at 210) features within the current video frame. In some embodiments, the features include points of interest such as corners, line intersections, etc. Identification of the features in each video frame is described by reference to FIGS. 3 and 4, below.

The process then describes (at 215) each identified feature in the current video frame. In some embodiments, each feature is described in terms of one or more parameters of a group of neighboring points. The description of the features in each video frame is described by reference to FIGS. 5 and 6, below. The process then determines (at 220) whether the current frame is the first frame in the sequence. If yes, the process optionally provides (at 225) a best fit that matches the most feature points. The process then proceeds to 205, which was described above.

Otherwise when the current frame is not the first frame, the process matches (at 230) the description of each point of interest in the current frame with the description of points of interest in the previous frame to identify a match between feature points in the current frame and the previous frame. Matching of the features in successive video frame is described by reference to FIGS. 7-11, below.

The process then calculates (at 235) the movement of each feature point from the previous frame to the current frame. Next, the process determines (at 240) whether the current frame is the second frame in the sequence. If yes, the process identifies (at 245) a homography between the first and second frame to describe movement of feature points between the pair of frames. The process then proceeds to 260 to store historical metrics for the feature points as described below.

As described further below, the homography between a pair of frames is determined by using a geometrically biased historically weighted RANSAC that is based on historical metrics and a geometric component that biases the solutions towards minimally distorted solutions. For the second frame in the video sequence the homography is calculated for the first time and historical metric are not available yet. However, the feature points that are matched between the first and second frames and have less motion between the two frames are more likely to be part of the background and contribute to the dominant motion of video sequence.

The process defines (at 245) a cost function that gives more weight to feature points with less motion between the first and second frames and includes a geometric component that biases the solutions that have minimal spatial distortion. The process then determines (at 247) a homography that describes the dominant motion from the first frame to the second frame using a weighted RANSAC method that uses the cost function and gives more weight to matched feature points with less motion between the first and second frames.

Utilizing homographies for stabilizing video sequences significantly outperforms existing video stabilization techniques that are based on simpler frame-to-frame affine transformations. An affine transformed plane is a plane that is either translated (i.e., moved), rotated, scaled (i.e., resized), or sheared (i.e., fixed in one dimension while the lines in other dimension are moved) but does not include, for instance, a plane subject to keystoning effect where a perspective image is projected onto a surface at an angle. On the other hand, homography captures any linear transformation (or distortion) of a two-dimensional plane in a three-dimensional space.

The RANSAC algorithm is used to come up with a consensus among feature point mappings that generate the homographies between two frames. Assuming that both frames are viewing the same plane from different positions and/or angles, homographies are used to determine how this hypothesized plane gets distorted from one frame to the other.

Homography is an invertible transformation that describes the changes in a perspective projection when the point of view of the observer changes. A homography is a 3 by 3 matrix:

$$M = \begin{bmatrix} m_{11} & m_{12} & m_{13} \\ m_{21} & m_{22} & m_{23} \\ m_{31} & m_{32} & m_{33} \end{bmatrix}$$

Given a point $X_1$ with coordinates $(a_1, b_1, 1)$ in one image and a point $X_2$ with coordinates $(a_2, b_2, 1)$ in another image, the homography relates the point coordinates in the two images if $X_2 = M X_1$. When the homography is applied to every pixel in an image, the image is a warped version of the original image.

Using a large number of points that match, the relative motion from frame N−1 to frame N is described by this matrix, which causes the inliers to move between frame N, and N−1. The shortcoming of using a simple RANSAC algorithm is that the method does not provide with much continuity through the video sequence. For instance, in a video sequence where the background dominates the scene (for instance the scene described by reference to FIG. 10, below) if a large object such as a bus comes into the scene, there would be more features on the bus than the background and the bus motion would become the dominant motion. On the other hand, the disclosed geometrically biased historically weighted RANSAC algorithm utilizes a cost function that is based on both weighting of each feature point based on historical metrics and a geometric component that biases towards minimally distorted (spatially plausible) solutions.

The process defines (at 250) a cost function that weights each feature point based on the historical metrics and includes a geometric component that biases solutions towards the solutions that have minimal spatial distortion. The process then determines homography between the current frame and the previous frame by performing (at 255) a geometrically biased historically weighted RANSAC to produce an inter frame homography that describes the motion from the previous frame to the current frame. As described in the following sections, some embodiments provide a novel technique to collect historical metrics for feature points and utilize the metrics to further refine the identification of the inliers and calculation of the dominant motion between the frames. Performing the geometrically biased historically weighted RANSAC method and using the historical metrics of feature points to determine the dominant motion is described by reference to FIGS. 12-15, below.

The process then calculates (at 260) historical metrics for each feature point. The process, for each feature in the current frame stores an historical metric that indicates (i) whether the feature has been an inlier or an outlier in a set of previous frames, (ii) the age of the feature to show in how many previous frames a feature was tracked, and (iii) the projection error of the feature calculated in the previous frame. Calculation of historical metrics for each feature point is described by reference to FIGS. 16-19, below.

The process then determines (at 265) whether all frames in the video sequence are examined. If not, the process proceeds to 205, which was described above. Otherwise, the process optionally optimizes (at 270) the calculated homographies. The process then ends. Optimizing the homographies is described by reference to FIG. 20, below.

A. Feature Identification

Some embodiments identify features in each frame by identifying a set of feature points that includes corners and line intersections. For instance, some embodiments identify feature points where there are two dominant edge directions in a local neighborhood of the point. Other embodiments also identify isolated points with a maximum or minimum local intensity as feature points.

Different embodiments use different techniques for feature detection. For instance, some embodiments utilize the high-speed "Features from Accelerated Segment Test" (FAST) algorithm to identify points of interest. FAST algorithm is described in "Machine Learning for High-Speed Corner Detection," Edward Rosten and Tom Drummond, Proceedings of the 9th European Conference on Computer Vision, Volume Part I, pages 430-443, 2006. This document is herein incorporated by reference. Other embodiments utilize other techniques such as Speeded Up Robust Features (SURF) feature detection method to identify points of interest. SURF algorithm is described in "Speeded Up Robust Features (SURF)," Herbert Bay, Andreas Ess, Tinne Tuytelaars, Luc Van Gool, Computer Vision and Image Understanding (CVIU), Vol. 110, No. 3, pp. 346-359, Sep. 10, 2008. This document is herein incorporated by reference. Yet other embodiments use other techniques such as optical flow to match points between frames.

FIG. 3 conceptually illustrates identifying a point of interest using FAST algorithm in some embodiments of the invention. As shown, frame 300 includes moving objects such as Ferris wheel 320, pedestrians 325, and bicycle rider 330. The frame also includes static objects such as a building 335, a bridge 340, and light poles 345.

For each point (e.g., each pixel) in the frame 300 one or more parameters of a set of neighboring points are examined. For instance, in the example of FIG. 3, 16 neighboring points are identified in a circle around point 305 (as shown by the highlighted points labeled 1 to 16). A parameter such as intensity of point 305 is compared with the intensity of the identified neighboring points. The point is identified as a feature point when the intensity of the point is either (i) more than the intensity of each of a contiguous sub-set of the neighboring points by a predetermined threshold or (i) less than the intensity of each of a contiguous sub-set of the neighboring points by a predetermined threshold. In the example of FIG. 3, point 305 is darker than 12 contiguous neighboring points (points labeled 11 to 16 and 1 to 6).

Figure 4:
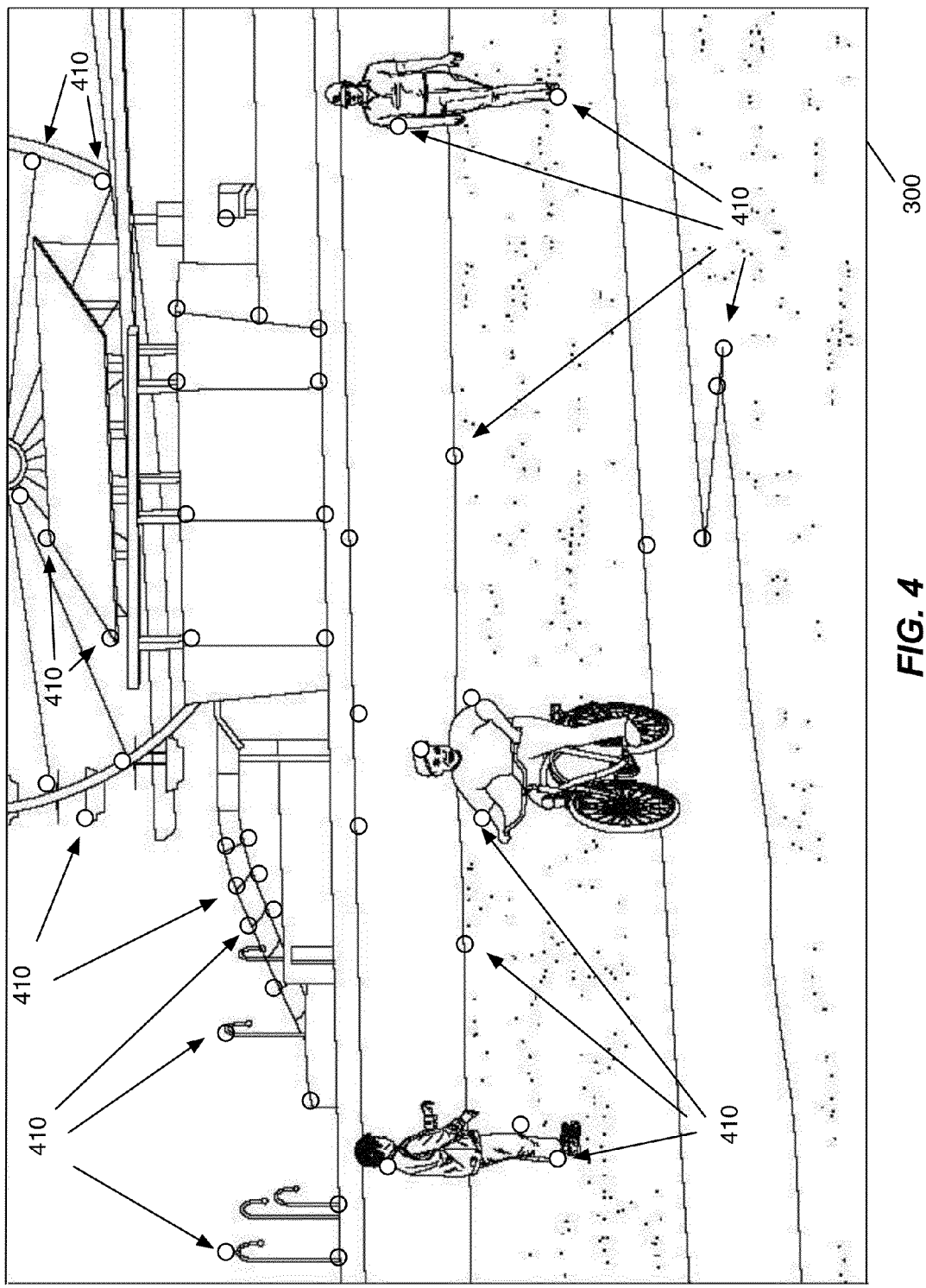
FIG. 4 conceptually illustrates frame after several feature points are identified in some embodiments of the invention.

In addition, some embodiments perform a quick test to exclude a large number of candidate points. In these embodiments, only the four pixels labeled 1, 5, 9, and 13 are examined and the point is discarded as a candidate feature point if the point is not brighter than at least three of these points by a threshold or darker than at least three of the points by a threshold. If a point is not discarded as a candidate feature point, then the intensity of the point is compared with the intensity of the 16 neighboring points as described above. FIG. 4 conceptually illustrates frame 300 after several feature points 410 are identified in some embodiments of the invention. Some embodiments identify hundreds or thousands of feature points in each video frame. For instance, some embodiments identify from 500 to 2000 of feature points for further processing.

B. Feature Description

After the feature points are identified on a frame, one or more parameters of each feature point is described in order to compare and match the points in different frames. Different embodiments use different techniques to describe the feature points. For instance, some embodiments utilize the "Binary Robust Independent Elementary Features" (BRIEF) algorithm to describe the features in each frame. BRIEF is described in "BRIEF: Binary Robust Independent Elementary Features," Michael Calonder, Vincent. Lepetit, Christoph Strecha, and Pascal Fua, European Conference on Computer Vision, 2010. This document is herein incorporated by reference. Other embodiments utilize the "Oriented FAST and Rotated BRIEF" (ORB) algorithm to define the feature points in each frame. The ORB algorithm is described in "ORB: An Efficient Alternative to SIFT or SURF," Ethan Rublee, Vincent Rabaud, Kurt Konolige, and Gary Bradski, Computer Vision (ICCV), 2011 IEEE International Conference on Computer Vision (ICCV). This document is herein incorporated by reference. Other embodiments utilize the above-mentioned SURF algorithm to describe the feature points.

Figure 5:
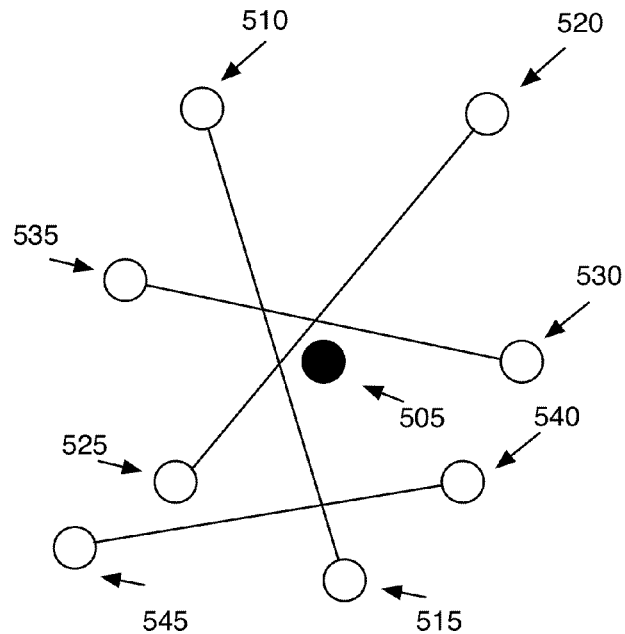
FIG. 5 conceptually illustrate describing a feature point using BRIEF method in some embodiments of the invention.

FIG. 5 conceptually illustrate describing a feature point using BRIEF method in some embodiments of the invention. The BRIEF method describes each point on the basis of a set of pairwise intensity comparisons. Different embodiments select different number of pairwise points (e.g., 128, 256, 512, etc.). As shown, for a feature point 505, a set of pairwise test points 510-515, 520-525, 530-535, etc. are identified (only a few pairs are shown for simplicity). In some embodiments, the test points are selected based on a predetermined pattern.

The method creates a bit vector corresponding to each pair of points. The bit value corresponding to each pair is 1 if the intensity of a particular point in the pair is higher or equal to the intensity of the other point in the pair. Otherwise, the bit value is 0.

Figure 6:
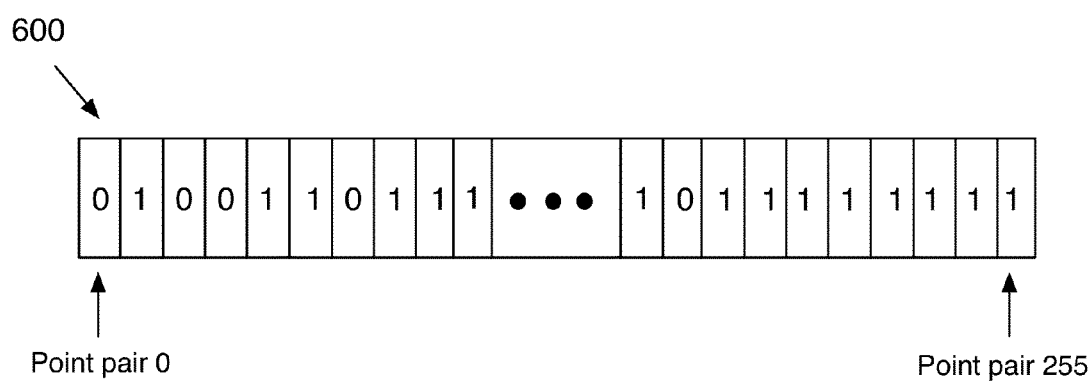
FIG. 6 conceptually illustrates a descriptor that describes a feature point on the basis of a set of neighboring points in some embodiments of the invention.

FIG. 6 conceptually illustrates a descriptor 600 that describes a feature point on the basis of a set of neighboring points in some embodiments of the invention. As shown, the descriptor includes 256 bits for each feature point, each bit corresponding to a pair of test points around the feature point. A value of 1 or 0 for each bit determines which test point in the pair has a higher intensity. The descriptor is a fingerprint that incorporates some of the neighboring information around the point. Although the examples of FIGS. 5 and 6 are described by reference to intensity values of each point, some embodiments utilize other parameters and/or use other ways of describing the feature points (e.g., by using phase difference between the pair of points around the feature point or by using any technique that generates a descriptor for a feature point that describes some of the neighboring information around the point).

C. Feature Matching

Once the feature points are identified and described, the descriptions are utilized to match the points between the frames. For each feature point selected in a current frame, a search is made to find a point in the previous frame whose descriptor best matches a predetermined number of bits in the descriptor of the selected feature point.

In order to expedite the search, some embodiments divide each frame into a grid of overlapping blocks and search for a point in the corresponding block of the previous frame. The rational is that features will not migrate too much from frame to frame and will typically remain within a single block. The overlap allows for the features to be tracked continuously as they travel over block edges.

Figure 7:
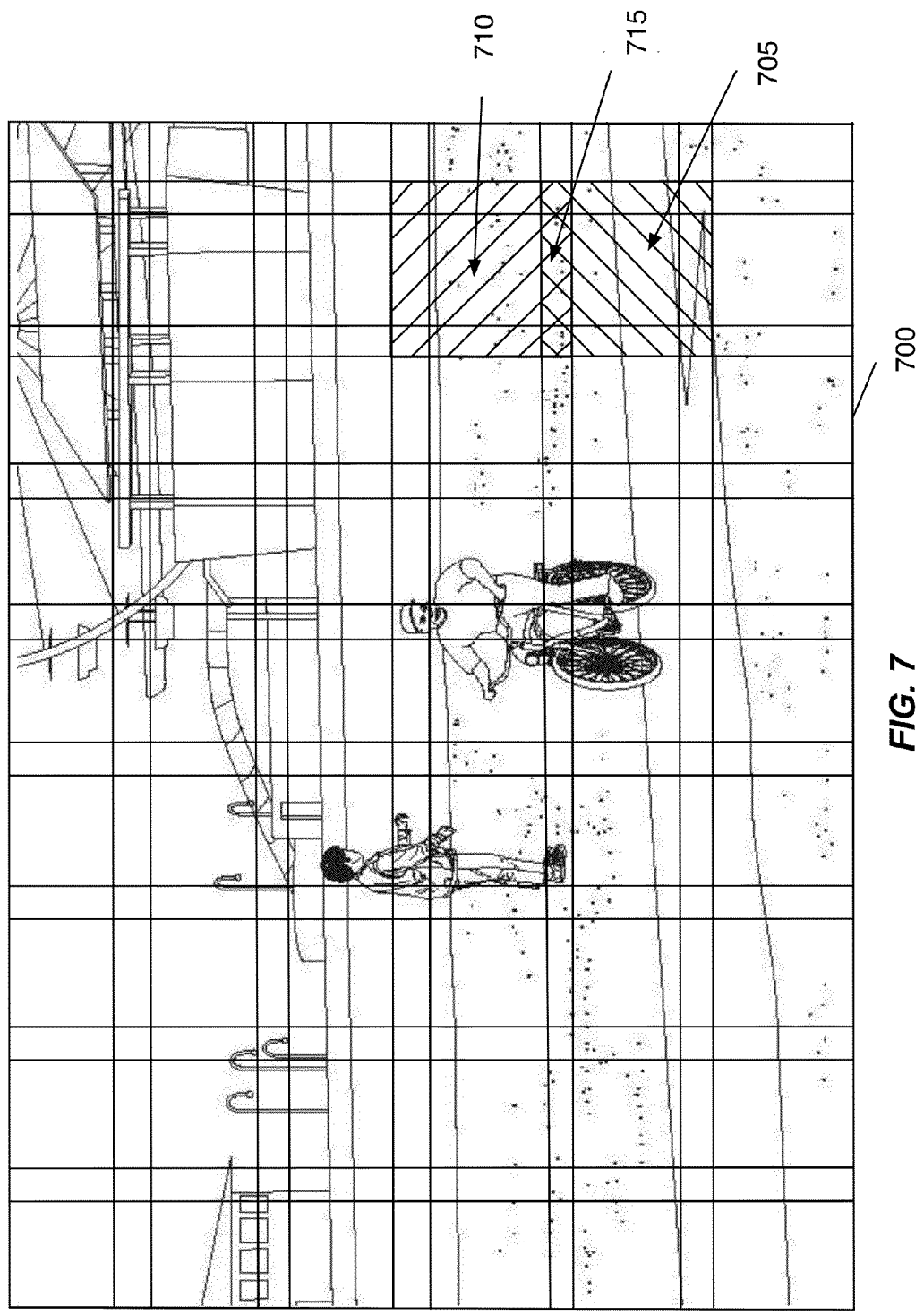
FIG. 7 conceptually illustrates a frame that is divided into a grid of overlapping blocks in some embodiment of the invention.

FIG. 7 conceptually illustrates a frame 700 that is divided into a grid of overlapping blocks in some embodiment of the invention. As shown, block 705 (shown by upper right to lower left hash marks) and block 710 (shown by upper left to lower right hash marks) have an overlapped area 715 with each other. Each block also has overlap with other surrounding blocks.

When matching features from frame N to N−1, some embodiments perform a two-step match. In the first step, a match is done from feature points in frame N to N−1. In this step, the two closest matches (in hamming distance) are found in frame N−1 for each feature in frame N. If the closest match is below a threshold, and if the difference between the distance of the closest and second closest is above a certain threshold (for example, "the closest is at least twice as close as the second-closest"), then the closest match is considered as a match candidate. The reasoning is that, if both the closest match and second closest match are very similar in distance, then the match is ambiguous, and is thrown out.

Once all frame-N-to-N−1 matches are found, a reverse match is performed in the second step. In this step, for all the matched-to points in N−1 identified in the first step, the closest matches in frame N is found by using the same method as the first step, but going from frame N−1 to frame N. If the matching is bidirectional for a pair of matches identified in first step (that is, for a point p1 in frame N and point p2 in frame N−1, p1's best match is p2, and p2's best match is p1) then the two points are identified as matched points.

Figure 8A:
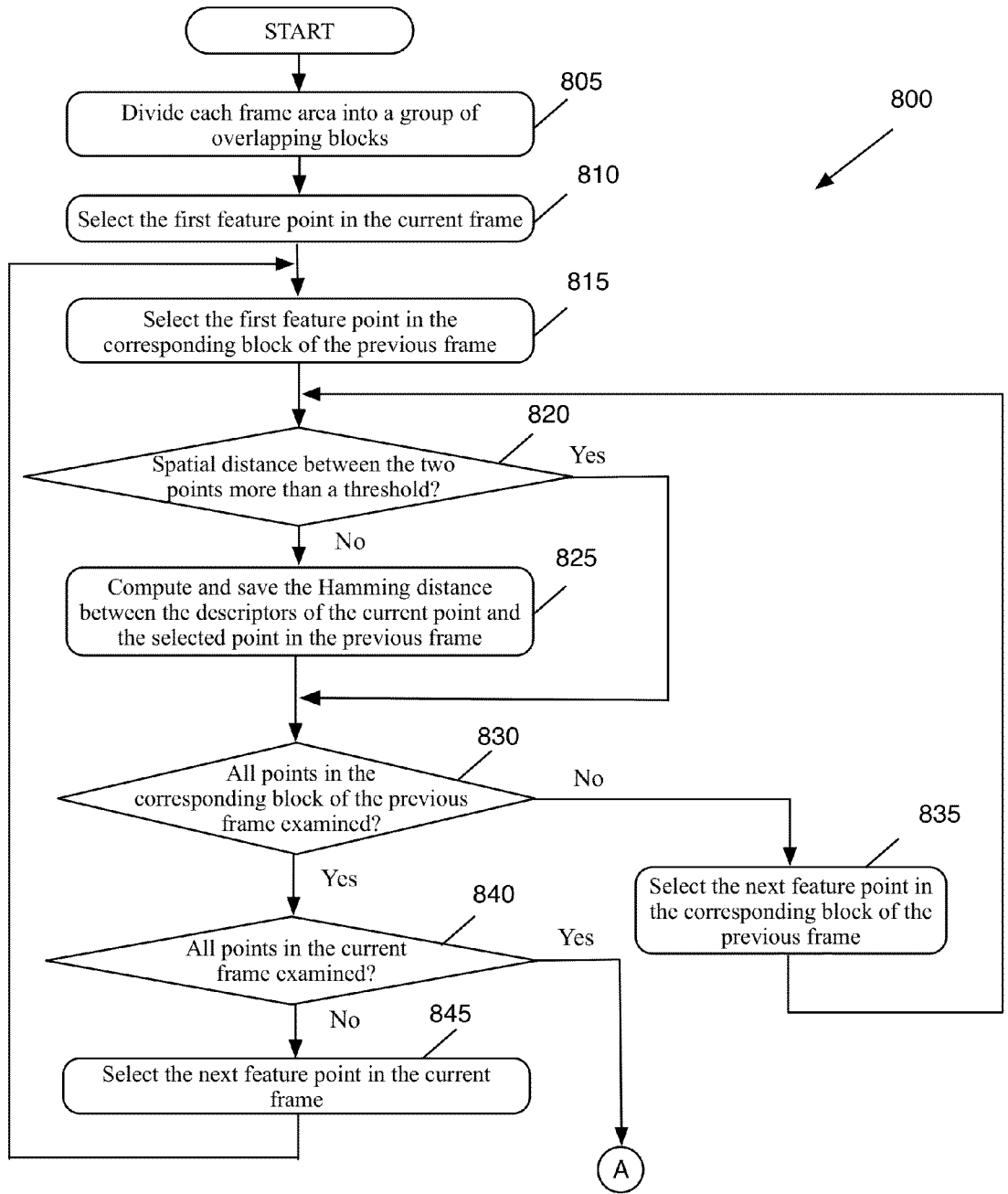
FIGS. 8A-8C conceptually illustrate a process for matching points between two frames in some embodiments of the invention.
Figure 8B:
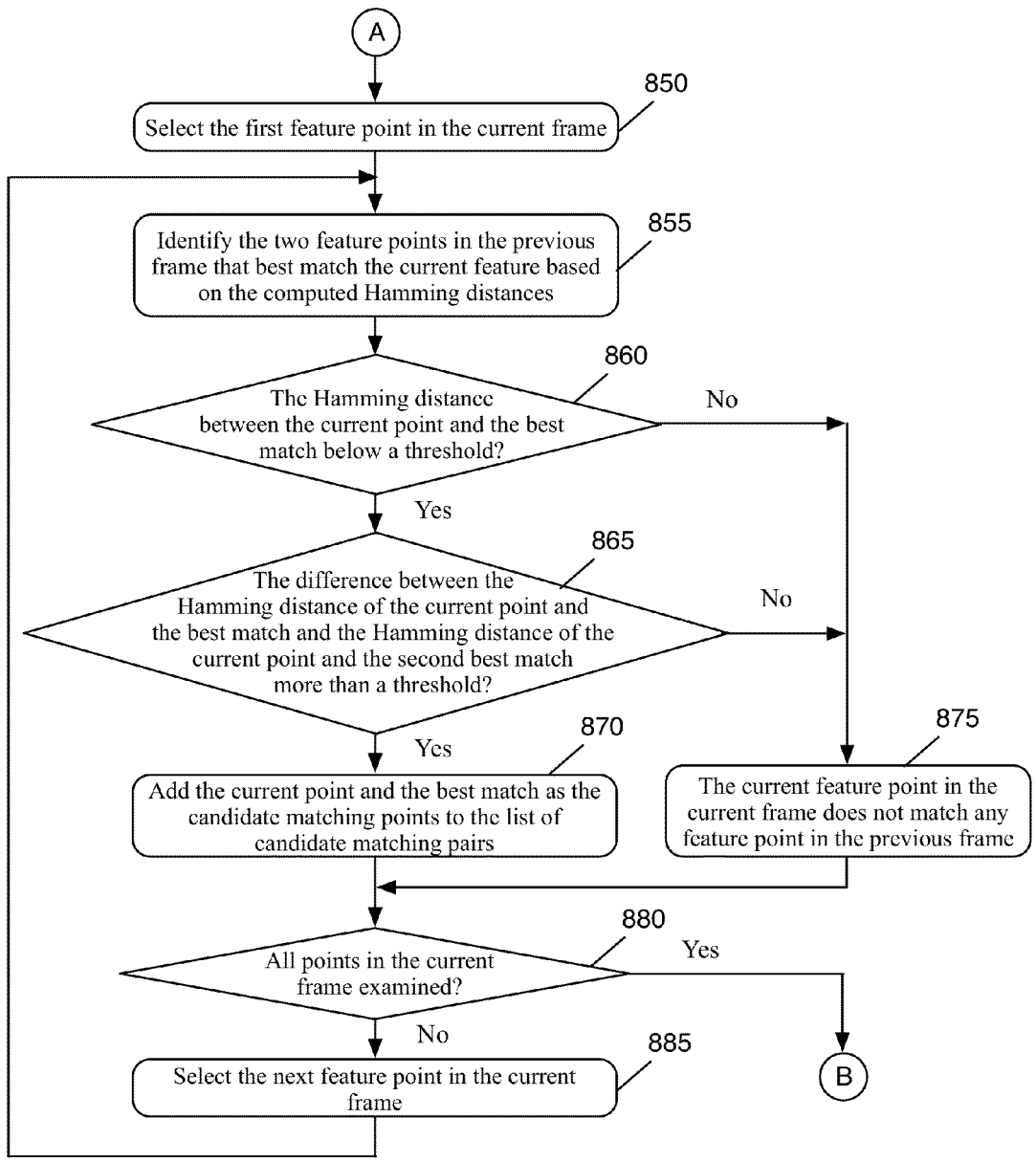
Figure 8C:
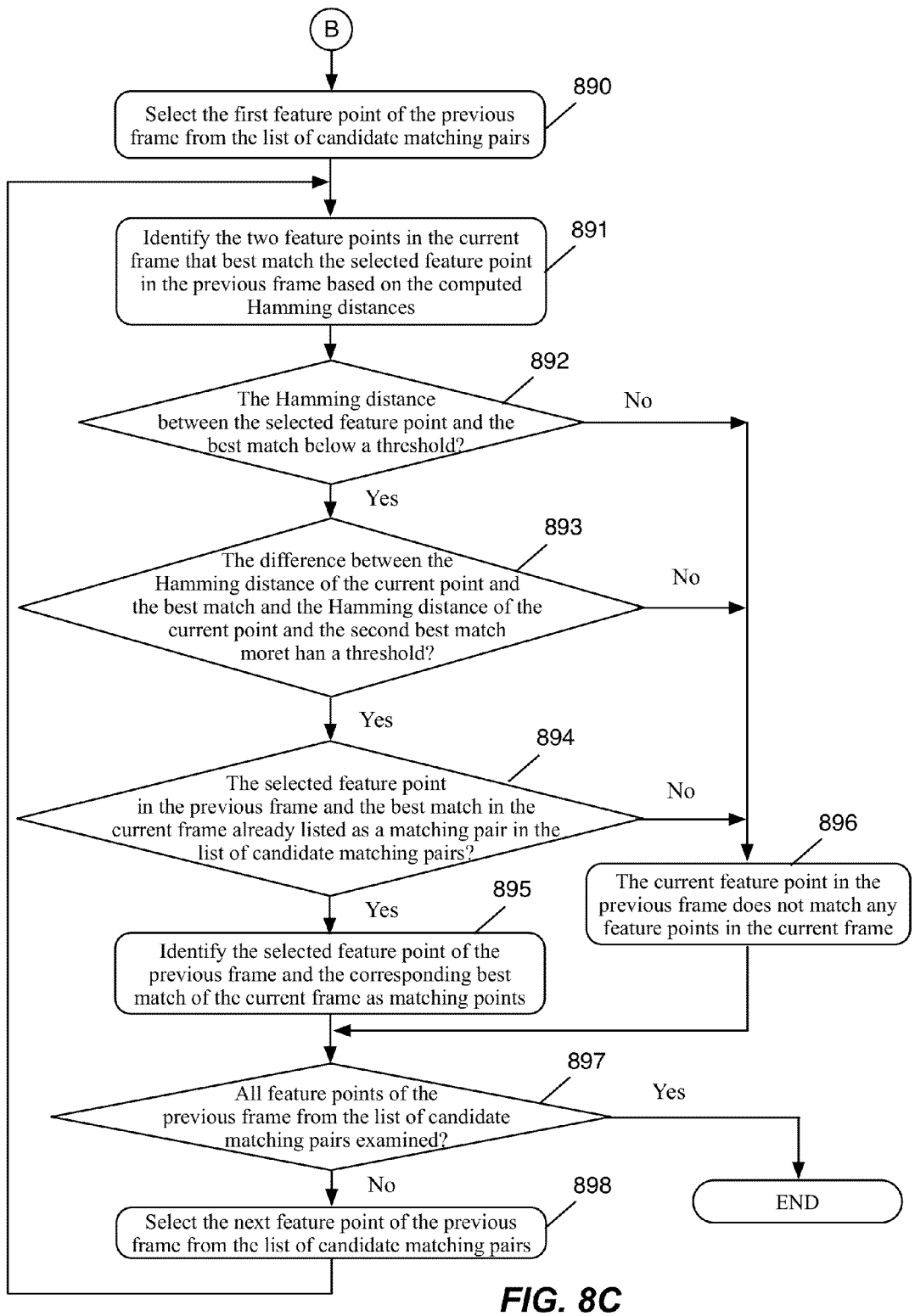

FIGS. 8A-8C conceptually illustrate a process 800 for matching points between two frames in some embodiments of the invention. As shown, the process divides (at 805) each frame into a group of overlapping blocks. The process then selects (at 810) the first feature point in the current. The process then selects (at 815) the first feature point in the corresponding block of the previous frame The process then determines (at 820) whether the spatial distance (i.e., the two dimensional distance) between the current feature point in the current frame and the selected feature of the previous frame is more than a predetermined threshold. If yes, the process does not consider the two points to be candidates for matching and proceeds to 830, which is described below.

Otherwise, the process computes and saves (at 820) the Hamming distance between the descriptors of the selected feature point in the current frame with the descriptor of the selected feature point in the previous frame. In some embodiments, the process makes a bitwise comparison of the descriptor of the feature point in the current frame with the descriptor of the selected feature point in the previous frame. In some embodiments, the descriptors are compared using the Hamming distance between the two descriptors. The feature points match if the Hamming distances are within a predetermined threshold. The Hamming distance between the two descriptors is the number of positions at which the corresponding bits are different. The Hamming distance measures the minimum number of substitution bits that are required to change one of the descriptors into the other.

The process then determines (at 840) whether all points in the current frame are examined. If not, the process selects (at 845) the next feature point in the current frame. The process then proceeds to 815, which was described above. Otherwise, the process selects (at 850) the first feature point in the current frame. The process then identifies (at 855) the two feature points in the previous frame that best match the current feature point based on the computed Hamming distances.

The process then determines (at 860) whether the Hamming distance between the current point and the best match is below a threshold. If not, the process proceeds to 875, which is described below. Otherwise, the process determines (at 865) whether the difference between the Hamming distance of the current point and the best match and the Hamming distance of the current point and the second best match is more than a threshold. If not, the process determines (at 875) that the feature point in the current frame does not match any feature point in the previous frame. The process then proceeds to 880, which is described below.

Otherwise, the process adds (at 870) the selected feature point in the current frame and the best matching feature point in the previous frame to the list of candidate matching pairs. The process then determines (at 880) whether all feature points in the current frame are examined. If not, the process selects (at 885) the next feature point in the current frame. The process then proceeds to 855, which was described above.

Otherwise, the process selects (at 890) the first feature point of the previous frame from the list of candidate matching pairs. The process then identifies (at 891) the two feature points in the current frame that best match the selected feature point in the previous frame based on the computed Hamming distances. The process then determines (at 892) whether the Hamming distance between the selected feature point and the best match is below a threshold.

If not, the process proceeds to 896, which is described below. Otherwise, the process determines (at 893) whether the difference between the Hamming distance of the current point and the best match and the Hamming distance of the current point and the second best match is more than a threshold. If not, the process determines (at 896) that the current feature point in the previous frame does not match any feature points in the current frame. The process then proceeds to 897, which is described below.

Figure 9:
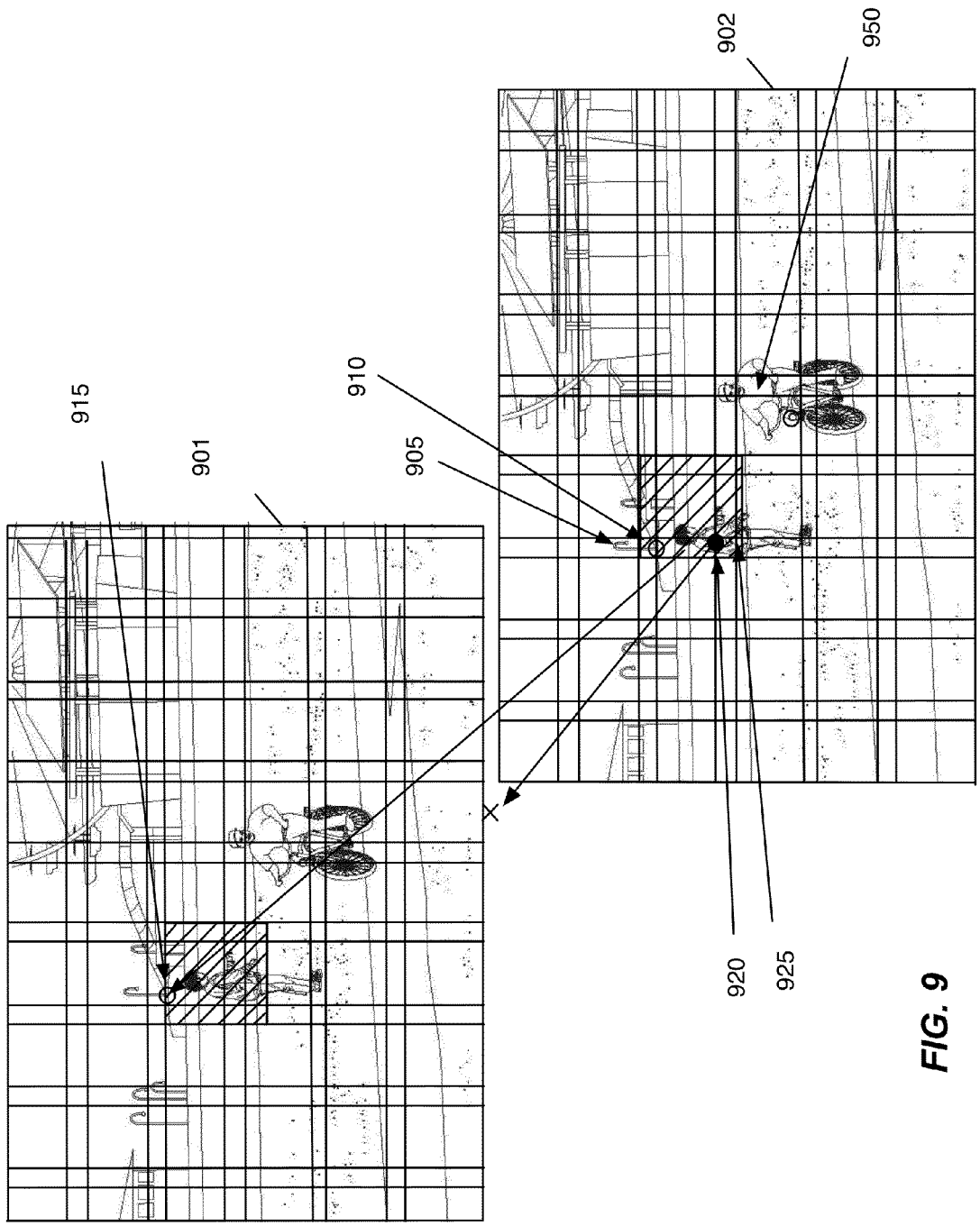
FIG. 9 conceptually illustrates matching of feature points in two consecutive frames in some embodiments of the invention.

Otherwise, the process identifies (at 895) the selected feature point of the previous frame and the corresponding best match of the current frame as matching points. FIG. 9 conceptually illustrates matching of feature points in two consecutive frames in some embodiments of the invention. As shown, feature point 910 (e.g., the base of the light pole 905) in the current frame 902 has a match 915 in the previous frame 901. On the other hand, feature point 920 (e.g., a fold in the clothing 925 of a person) in frame 902 does not have a match in the pervious frame 901.

Referring back to FIG. 8, the process then determines (at 897) whether all feature points of the previous frame from the list of candidate matching pairs are examined. If yes, the process ends. Otherwise, the process selects (at 898) the next feature point of the previous frame from the list of candidate matching pairs. The process then proceeds to 891, which was described above.

Figure 10:
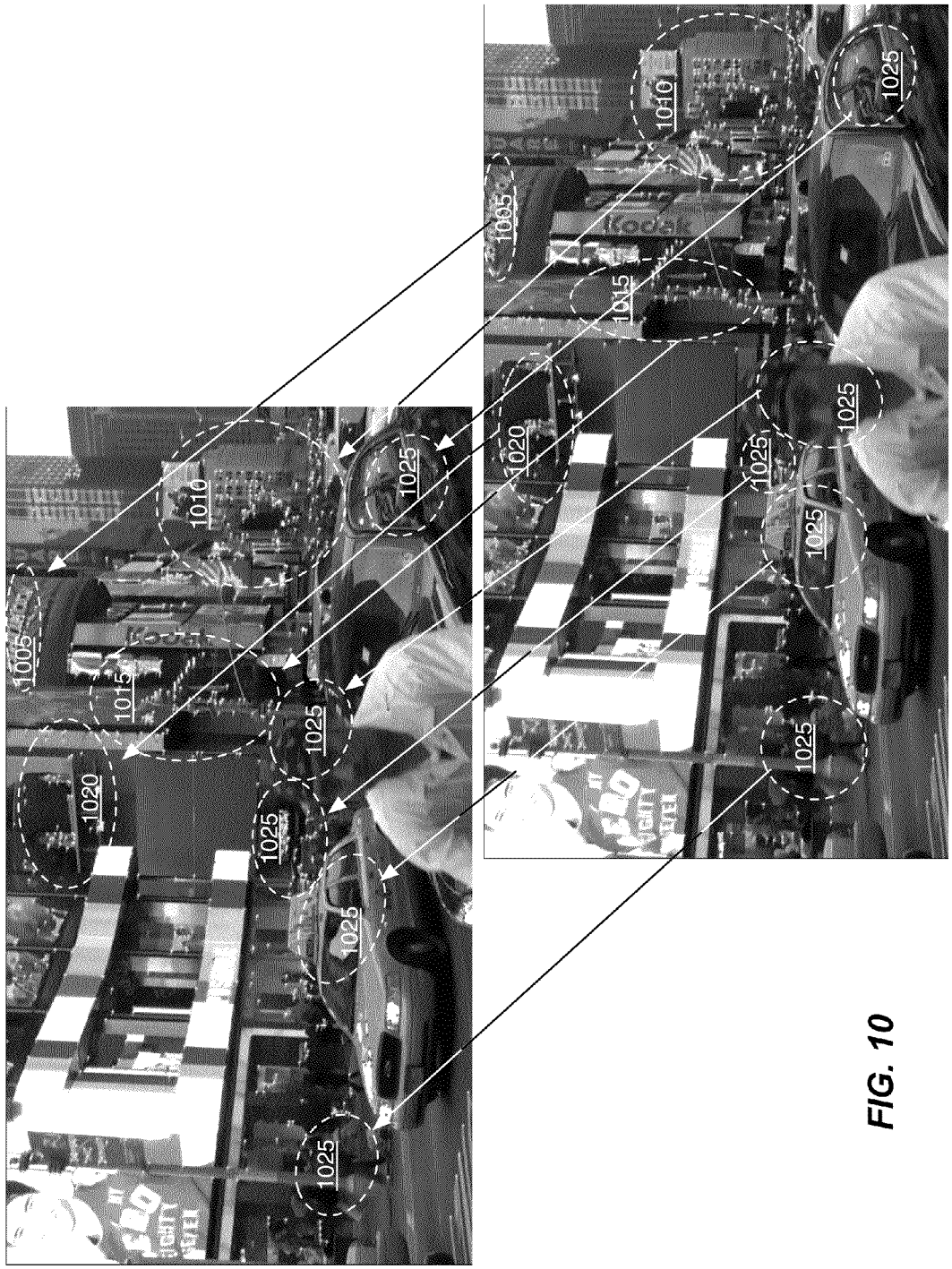
FIG. 10 illustrates matching of the feature points between two frames in some embodiments of the invention.

FIG. 10 illustrates matching of the feature points between two frames in some embodiments of the invention. As shown, feature points 1020 on the fix objects such as building and parked cars as well as feature points 1025 on moving objects are matched between the two frames. However, as described below, the feature points on moving objects do not contribute to determining the dominant motion and the goal of the method of some embodiments is to exclude and ignore transient objects that move through the frame when calculating the inter-frame transformation of the dominant plane.

Some embodiments provide an option for a user to indicate a subject in a video sequence that should be the focus of stabilization. For instance, a vehicle during a race containing a lot of other vehicles, the individual 330 on a bicycle in the example of FIG. 3, a building behind a lot of traffic and pedestrians, etc. The subject may not dominate the scene spatially, and thus may not be detected as the dominant motion of the video sequence. These embodiments allow the algorithm to provide a video sequence in which the travel of a desired subject was smooth.

Figure 11:
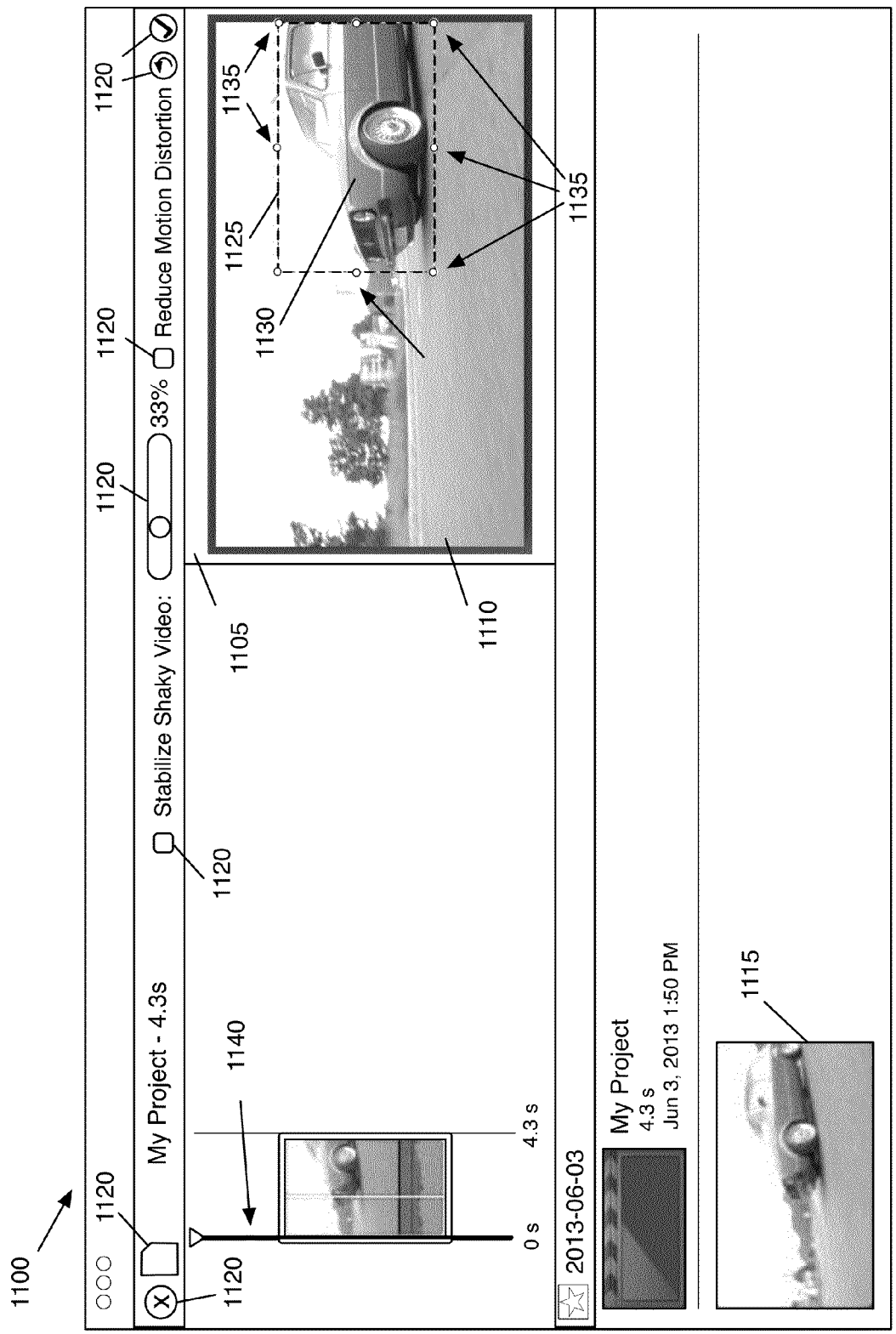
FIG. 11 conceptually illustrates a user interface for selecting a subject upon which to focus stabilization in some embodiments of the invention.

FIG. 11 conceptually illustrates a user interface 1100 for selecting a subject upon which to focus stabilization in some embodiments of the invention. The user interface includes a display area 1105 for displaying a selected frame 1110 of a video sequence 1115. The user interface also includes several controls 1120 to perform video stabilization and an indicator 1140 to show the relative position of the current frame 1110 in the video sequence.

As shown, the user interface provides the option for the user to select an area in the video frame to be the focus of stabilization. For instance, the user interface allows drawing a shape (such as rectangle, a circle, a lasso, etc.) or identifying a set of points on the video frame to define a polygon around a desired subject. In this example, the user has identified a polygon 1125 by identifying a set of points 1135 around a desired subject such the automobile 1130 shown in the video frame. The identification of this area of interest is done on the first frame of the video sequence in some embodiments.

By selecting an area around the desired subject (in this example the automobile 1130) the user indicates that the algorithm should stabilize the motion of the automobile, rather than the motion of the background. Only features found within the selected region are used for the initial weighted RANSAC calculation that determines homography between a pair of frames. Once the weighted RANSAC homography estimation has been performed with the selected subset of points, other points outside of the selected region can also be found to be inliers in the plane of dominant motion. The historical metrics of those points (along with those within the selected area of interest) are then initialized as being inliers, which would bias towards their selection as the dominant motion during analysis of subsequent frames. In some embodiments, histories of features within the selected area of interest are biased more heavily for selection as future inliers in the weighted RANSAC calculations (e.g., by initializing their histories to indicate a long history of being an inlier).

D. Determine Homographies Between Frames and the Dominant Motion of the Video Sequence Using Historical Metrics for Feature Points Finding the same point in two frames allows determining how the feature points move relative to each other. Once the matches have been established, some embodiments determine homographies that describe the travel of the feature points between the frames. Some embodiments utilize a novel geometrically biased historically weighted RANSAC method to determine the inter frame homographies.

A RANSAC algorithm iteratively examines a set of data points to estimate parameters of a model from a set of observed data that includes inliers and outliers. RANSAC identifies inliers and outliers. RANSAC algorithm is non-deterministic and produces the results with a certain probability that increases as more iterations are performed. The inliers are points (or pair of points) that are considered part of the dominant motion plane. Inlier feature points contribute to a solution for the dominant motion that is consistent; outliers do not.

Some feature points are attached to objects that are moving through the plane of the image (e.g., the person 950 on the bike in FIG. 9). These feature points have motion in the scene that is not because of camera shake, but is because the objects are moving through the scene. Smoothing these feature points is not desirable and will distort what is actually happing in the scene. Instead, the feature points that are attached to the background (e.g., point 910 in FIG. 9) are not supposed to be moving and their motion corresponds to the dominant motion in the video sequence (e.g., the panning of the video camera).

Figure 12:
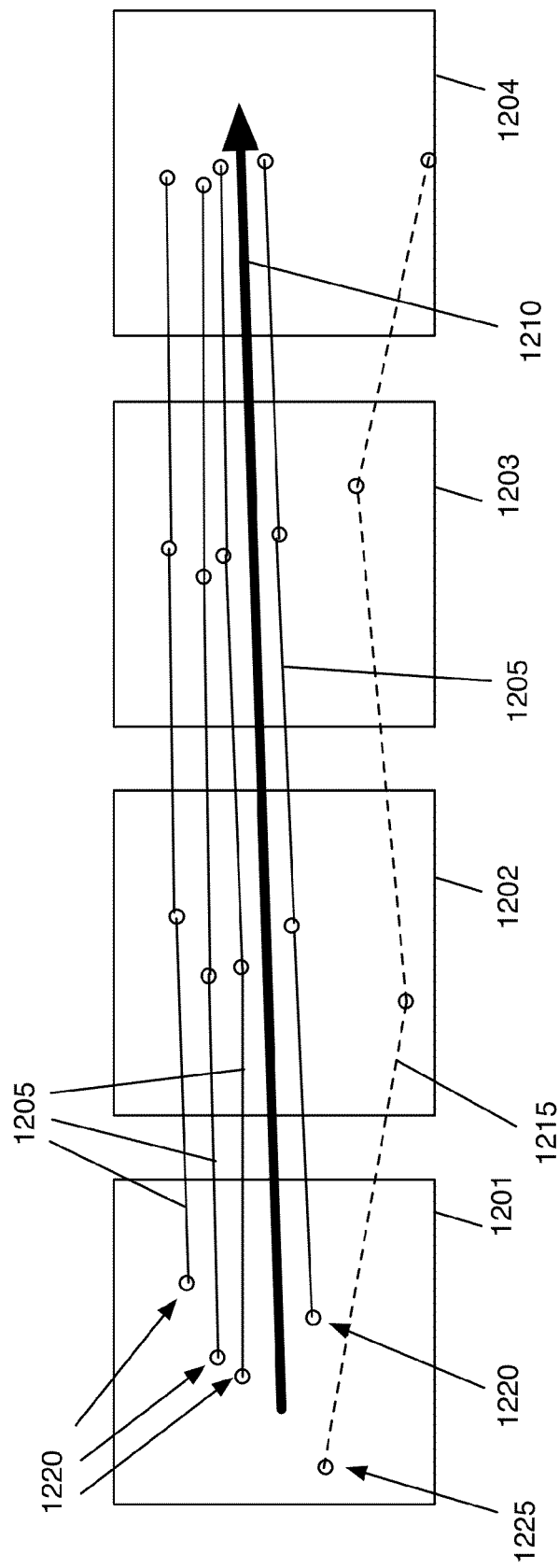
FIG. 12 conceptually illustrates the relationship of the movement of several feature points through different frame with the dominant motion of the video sequence in some embodiments of the invention.

FIG. 12 conceptually illustrates the relationship of the movement of several feature points through different frames with the dominant motion of the video sequence in some embodiments of the invention. As shown, several feature points 1220 and 1225 are moving through a sequence of frames 1201-1204. In this example, feature points 1220 are identified on fix objects (e.g., buildings, bridges, parked cars, etc.). The motion trajectory 1205 of these points closely follows the dominant motion 1210 of the video sequence. On the other hand, the motion trajectory 1215 of a feature point 1225 identified on a moving item (such as a passing car or a passing person moving in a random direction) does not follow the dominant motion 1210 of the video sequence.

Figure 13A:
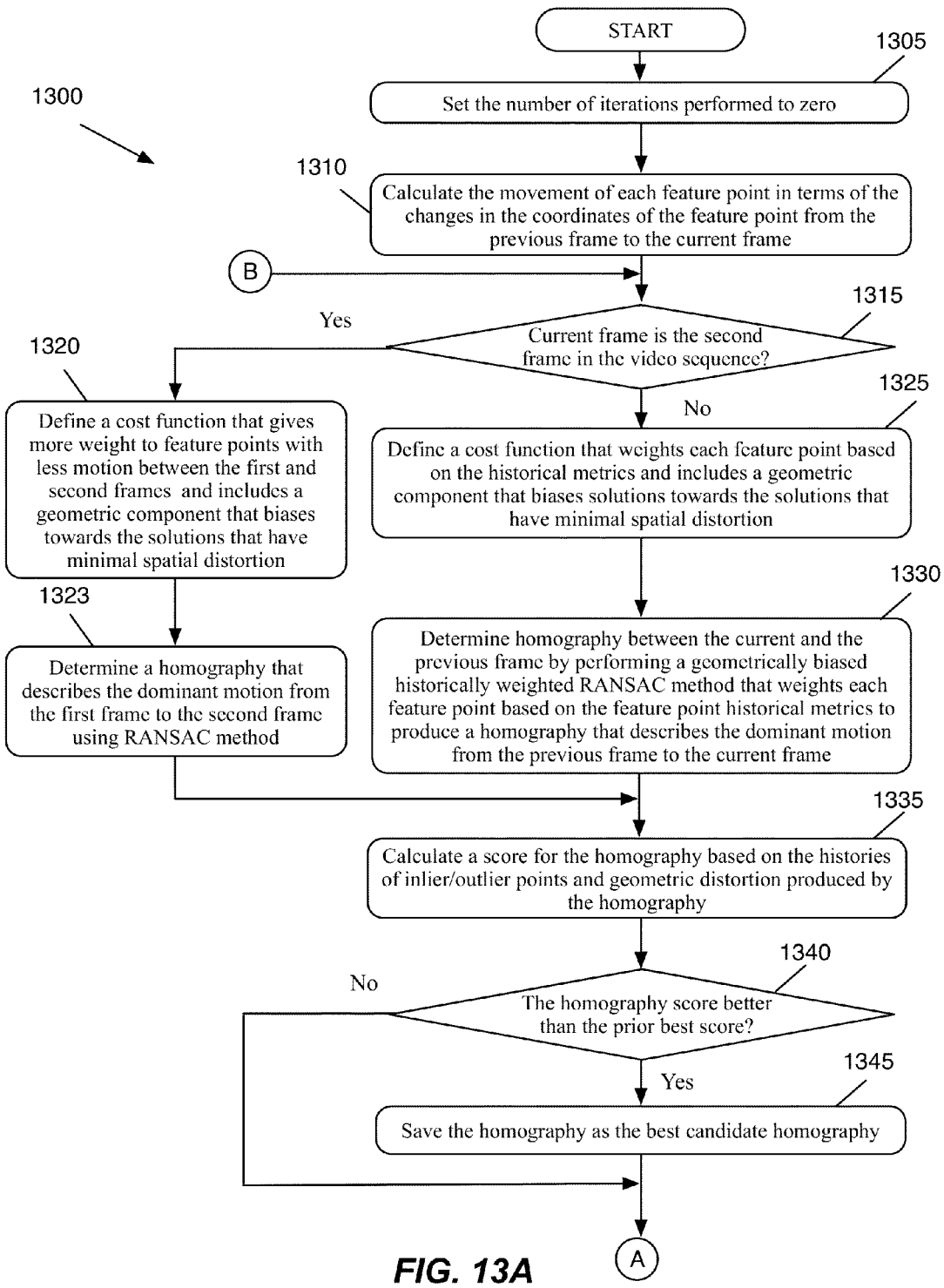
FIGS. 13A-13B conceptually illustrate a process that is utilizing a geometrically biased historically weighted RANSAC to determine homography between a pair of frames in some embodiments of the invention.
Figure 13B:
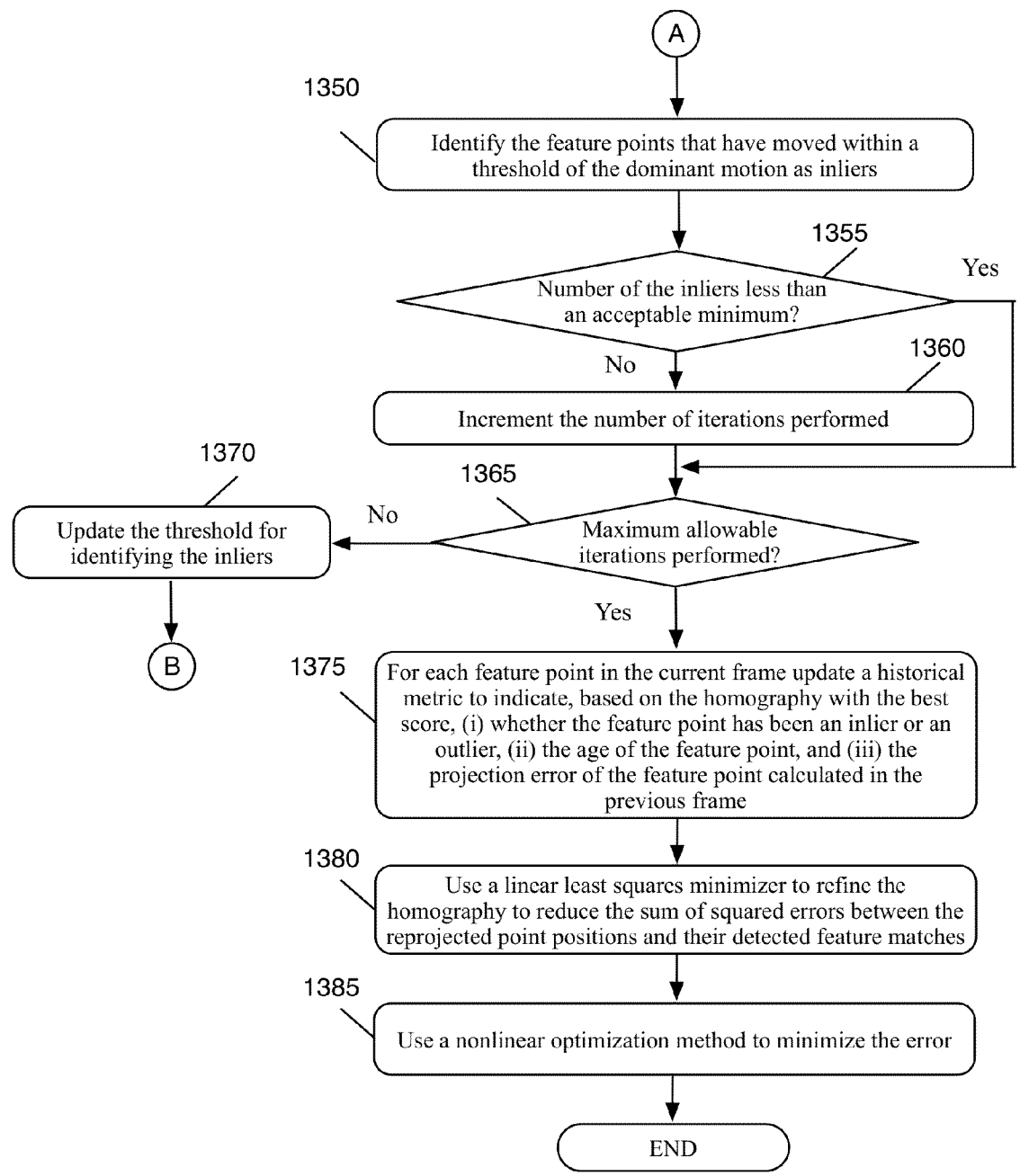

FIGS. 13A-13B conceptually illustrate a process 1300 for utilizing the weighted RANSAC to determine the inlier and outlier feature points and their motion between a current frame and a previous frame in some embodiments of the invention. As shown, the process sets (at 1305) the number of iterations of the process to zero. The process then calculates (at 1310) the movement of each feature point in terms of the changes in the coordinates of the feature point from the previous frame to the current frame.

The process then determines (at 1315) whether the current frame is the second frame in the video sequence. If not, the process proceeds to 1325, which is described below. When the current frame is the second frame, historical metrics for the feature points are not determined yet. However, the feature points that are matched between the first and second frames and have less motion between the two frames are more likely to be part of the background and contribute to the dominant motion of video sequence.

Therefore, when the current frame is the second frame, the process defines (at 1320) a cost function that gives more weight to feature points with less motion between the first and second frames and includes a geometric component that biases towards the solutions that have minimal spatial distortion. The process then determines (at 1323) a homography that describes the dominant motion from the first frame to the second frame using a weighted RANSAC method that uses the cost function and gives more weight to matched feature points with less motion between the first and second frames. The process then proceeds to 1335, which is described below.

The homography between the first and second frame in some embodiments is determined based on a traditional RANSAC algorithm. When the current frame is subsequent to the second frame, historical metrics for the feature points are already determined and stored (as described by reference to operation 1345, below) and all other subsequent homographies are determined using the geometrically biased historically weighted RANSAC algorithm. In some embodiments, the historical metrics and the geometric components are determined for the first frame based on a consensus vote (i.e., the traditional RANSAC). In these embodiments, operations 1315 and 1320 are bypassed and the homography between the first and second frames is also determined using the geometrically biased historically weighted RANSAC algorithm.

The process defines (at 1325) a cost function that weights each feature point based on the historical metrics and includes a geometric component that biases solutions towards the solutions that have minimal spatial distortion. The following pseudo code defines the cost function used for scoring the geometrically biased historically weighted RANSAC method of some embodiments.

```
float calculate_ransac_score( )
{
    float total_score = 0
    // loop through all inliers to calculate features
    foreach inlier feature i {
        // initialize point's score to 1
        float point_score = 1.0;
        // get values for how many times the point has been an inlier and outlier
        float inlier_count = [number of times i has been an inlier];
        float outlier_count = [number of times i has been an outlier];
        // scale score based on inlier and outlier counts
        point_score *= pow(1.2, inlier_count);
        point_score /= pow(1.2, outlie_count);
        // bias against points that had large reprojection error in last frame
        if [feature i has a history prior to the previous frame] {
            point_score /= (1+[last reprojection error of feature i]);
        }
        // bias against points with more travel
        point_score /= (1+sqrt([spatial travel of feature i between consecutive frames]))
        total_score += point_score;
    }
    // find maximum deviation from 90 degrees for each of the four corners when
    // the video frame is reprojected with the candidate homography
        float angle_deviation = max_deviation_from_90_degrees(reprojected_corner_angles);
    float deviation_cosine = cos(angle_deviation);
    // scale the entire score by factor related to cos of deviation, bigger deviation = smaller
score
    total_score /= (1+10*deviation_cosine);
    // find max travel of each of the four corners when the video frame is reprojected
    // with the candidate homography
    float max_corner_travel = max(reprojected_corners-original_corners);
    // scale based on corner travel: more travel = smaller score
    total_score /= (1+sqrt(max_corner_travel));
        return total_score;
}
```

As shown by the above pseudo code, the cost function returns a total score for each result generated by the geometrically biased historically weighted RANSAC algorithm. For each inlier, the cost function identifies the number of times the point has been and inlier and outlier and scales the score based on the inlier and outlier counts.

The cost function also biases against points that had large reprojection error in the last frame and the points that had more motion. The cost function also includes a geometric component. The geometric acceptance criteria are based on the two following measurements: the angle distortion at the corners of the reprojected frame and the maximum corner travel of the reprojected frame.

When applying the detected motion homography to the original video frame, the cost function calculates the maximum angle change from 90 degrees for each of the four corners. The cost function then calculates the cosine of this angle over the maximum distance traveled by any of the detected inliers for that frame. When the ratio of cos(angle_delta)/max_inlier_travel exceeds a predetermined threshold, (e.g., 1.0) the algorithm result is considered a failure for this frame.

The cost function also applies the detected motion homography to the frame bounds, and calculates the maximum difference in position between the original four corners and their reprojected positions. The cost function then calculates the ratio of this maximum travel over the median of the travel of all inlier features. If this ratio of max_corner_travel/median (feature-travel) exceeds a predetermined threshold (e.g., 2.5) then the algorithm result is considered a failure for this frame.

The process then determines (at 1330) homography between the current and the previous frame by performing a geometrically biased historically weighted RANSAC method that uses the cost function and weights each feature point based on the feature point historical metrics to produce a homography that describes the dominant motion from the previous frame to the current frame. The geometrically biased historically weighted RANSAC method weights each feature point based on the feature point historical metrics to produce a homography that describes the dominant motion from the previous frame to the current frame.

The process then calculates (at 1335) a score for the determined homography based on the histories of the inlier/outlier points and geometric distortion produced by the homography (e.g., as described by reference to the pseudo code, above). The process then determines (at 1340) whether the score is better than the prior best score. If not, the process proceeds to 1350, which is described below. Otherwise, the process saves the determined homography as the best candidate homography.

The information saved in historical metrics for each feature point is used to calculate a better estimate of for the dominant field of motion in the video sequence. For instance, the process can determine that 750 feature points are identified in a frame N, 500 of which match to feature points in frame N−1. And, of those 500 matches, 410 have a history, which means they at least existed in frame N−2, and have been used to calculate the motion homography in the past. And, of those 410 feature points, 275 were inliers in the calculation of the motion and the remaining 135 were outliers. In addition, for each of those points with a history, the projection error is used to determine how closely the points' travel matched the dominant motion plane in the prior frame.

Some embodiments utilize the historical metrics and the geometric bias to perform a geometrically biased historically weighted RANSAC (or RANSAC with a cost function associated with each point), where inclusion of prior inliers (particularly those with long history of being inlier) is weighted heavily and the feature points that have long been major outliers are weighted lightly, or in some embodiments negatively. Features that are new (i.e., without much history) are considered positively in order to allow a homography that describes as much of a frame as possible.

The weighted RANSAC is utilized in some embodiments to provide a homography that describes the motion from frame N−1 to frame N. These embodiments, define a cost function to optimize. The cost function associates a weight with each point, rather than having each point has the same weight. Each point, depending on the history of being an inlier, age, and projection error has a sway or controlling influence in the cost function. The geometric component biases the solution towards solutions with minimal spatial distortion.

Figure 14:
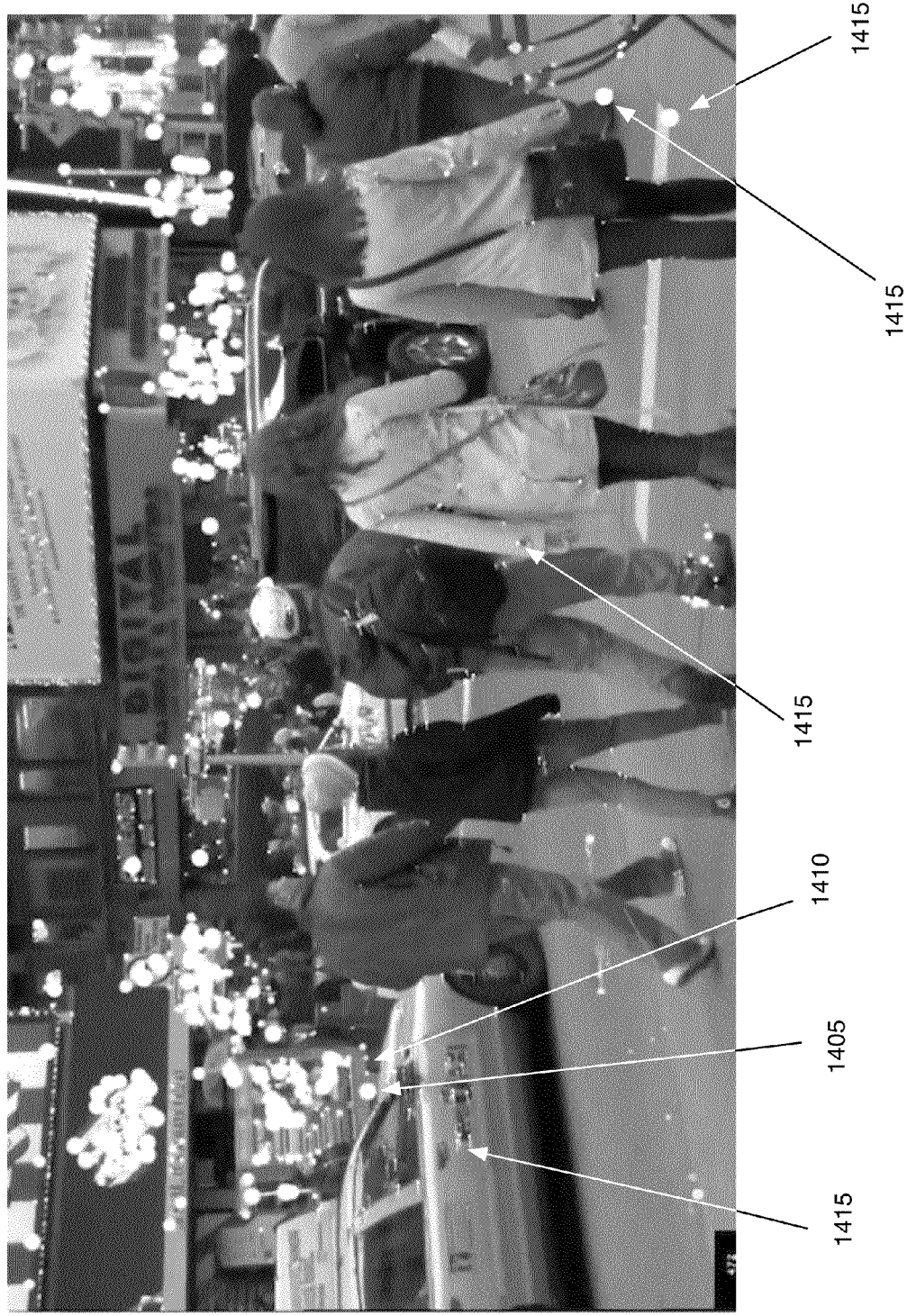
FIGS. 14 and 15 illustrate two consecutive frames of a video sequence in some embodiments of the invention where historical metrics are utilized to identify the inlier and outlier feature points.
Figure 15:

FIGS. 14 and 15 illustrate two consecutive frames of a video sequence in some embodiments of the invention where historical metrics are utilized to identify the inlier and outlier feature points. In FIG. 14, feature points are shown as circles (e.g., feature points 1405-1415). The larger a circle, the longer the corresponding feature point has been tracked (i.e., the larger the value stored in data structure 1700 shown in FIG. 17). For instance, feature point 1405 has been tracked for a much longer time than feature point 1410. The figure shows the inlier feature points 1405-1410 (such as feature points on static objects) as well as the outlier feature points 1415 (such as feature points on walking persons or moving vehicles).

FIG. 15 illustrates the next frame in the sequence of video frames. The inliers 1505 correspond to static features such as buildings, the street, and people standing still that are considered part of the dominant field of motion. The outliers 1510 correspond to moving objects such as cars and walking people that do not contribute to the description of the dominant motion. The method described herein smooths the positions of the inlier feature points 1505 and ignores any of the other feature points 1510. The inliers within the context of the RANSAC algorithm are points that contribute towards a good global homography solution and whose distribution can be explained well by parameters of that estimated transformation model.

Referring back to FIGS. 13A-13B, the process identifies (at 1350) the feature points that have moved within a threshold as the inliers. Other feature points are identified as outliers. The process then determines (at 1355) whether the number of inliers is less than an acceptable minimum. If not, the process proceeds to 1365, which is described below.

The threshold for each point is an absolute travel distance in any direction. In determining inliers/outliers, the process takes the homography determined in step 1330 and applies that homography mapping to all points within frame N−1, which will produce their projected positions into frame N. If the projected position of a point differs from the actual position of the point's matched feature by more than an acceptable threshold, the process considers the point to be an outlier, otherwise the point is an inlier.

In some embodiments such as real-time applications or where the computing resources are limited, when the first satisfactory solution is found, the process ends (not shown). In other embodiments, the process performs a certain number of iterations to find better solution. In these embodiments, the process increments (at 1360) the number of iterations performed by one.

The process then determines (at 1365) whether the maximum allowable iterations are performed. If not, the process updates (at 1370) the threshold for identifying the inliers. For instance, when the solution was acceptable (i.e., the number of inliers was determined at 1350 to be larger than or equal to the acceptable minimum), the process decreases the threshold to fit the inliers in order to find a better estimate for the dominant motion. On the other hand, when the solution was unacceptable (i.e., the number of inliers was determined at 1350 to less than the acceptable minimum), the process increases the threshold to fit the inliers in order to find an acceptable number of inliers. The process then proceeds to 1315, which was described above.

The process calculates (at 1375) historical metrics for each feature point. The process, for each feature in the current frame stores an historical metric that indicates (i) whether the feature has been an inlier or an outlier in a group of previous frames, (ii) the age of the feature to show in how many previous frames a feature was tracked, and (iii) the projection error of the feature calculated in the previous frame. Calculating and updating the historical metrics for feature points is described in more detail below.

The process then performs a refinement step on the resulting homography, which minimizes the projection error between the sets of matched points between the two frames. The process uses (at 1380) a linear least squares minimizer to refine the homography to reduce the sum of squared errors between the reprojected point and their detected feature matches. The process then uses (at 1385) a nonlinear optimization method to minimize the error. Some embodiments perform Levenberg-Marquardt nonlinear optimization. Other embodiments utilize other non-linear optimization methods such as Broyden-Fletcher-Goldfarb-Shanno (BFGS), scaled conjugate gradient, etc. to minimize the error. Some embodiments perform the nonlinear optimization for several iterations (e.g., until the error is below a predetermined threshold or a certain number of iterations are performed). The process then ends.

E. History and Metrics

Some embodiments maintain historical metrics for feature points identified in each frame to utilize in determination of the dominant motion among the frames. Once an initial determination of the inliers and outlier is done (e.g., by performing process 1300 described by reference to FIGS. 13A and 13B) the feature points in the current frame are flagged as inliers or outliers.

Figure 16:
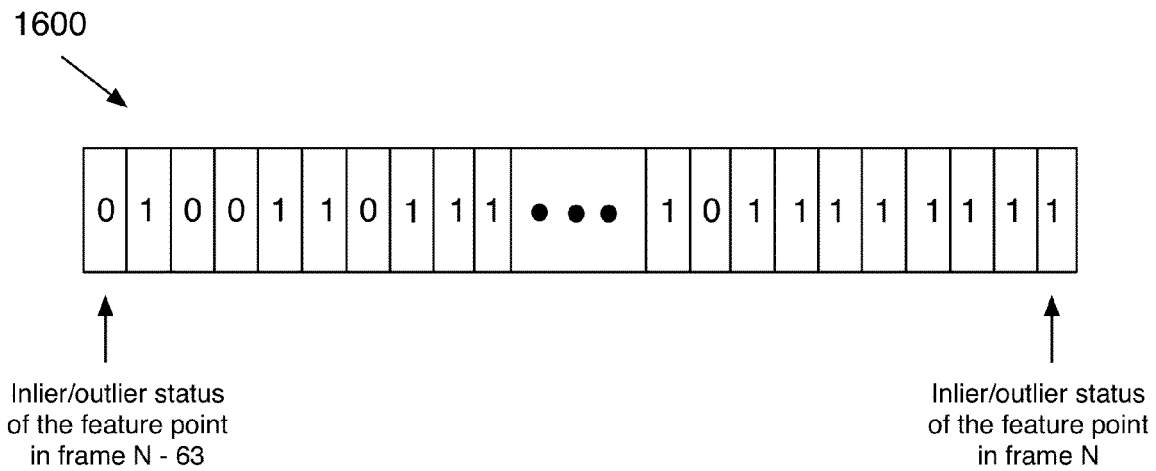
FIG. 16 conceptually illustrates the metrics maintained for a particular feature point in some embodiments of the invention.

FIG. 16 conceptually illustrates the metrics maintained for a particular feature point in some embodiments of the invention. In this example, the historical metrics is maintained for 64 frames. Other embodiments maintain historical metrics for a different number of frames. As shown, the particular feature point in frame N was an inlier, i.e., a part of the dominant motion (as indicated by a value of 1) and an outlier, i.e., not part of the dominant motion (as indicated by a value of 0) in different previous frames. For instance, the feature point was an inlier in frames N and N−1 but was an outlier in frame N−63.

Figure 17:
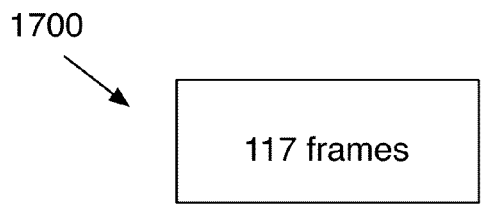
FIG. 17 conceptually illustrates the age maintained for a particular feature point in some embodiments of the invention.

In addition, some embodiments maintain an age for each feature point to indicate in how many previous frames the feature point has been tracked. FIG. 17 conceptually illustrates the age maintained for a particular feature point in some embodiments of the invention. As shown by the feature point age 1700, the particular feature point has been tracked in the past 117 frames.

Figure 18:
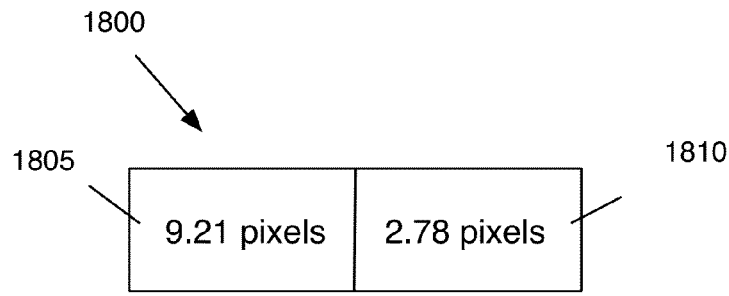
FIG. 18 conceptually illustrates the projection error calculated for a particular feature point in some embodiments of the invention.

Some embodiments also calculate the projection error for each feature point (i.e., how much the feature point moved away from the dominant field of motion). FIG. 18 conceptually illustrates the projection error calculated for a particular feature point in some embodiments of the invention.

As shown, the particular feature point had a projection error of 9.21 pixels (as shown by 1805) in the x dimension and 2.78 pixels (as shown by 1810) in the y dimension. This is the error between the projection that was given for the dominant motion and where this feature point is actually mapped. As described by reference to FIGS. 13A-13B above, some embodiments applies the homography that is determined between frames N−1 and N to all points within frame N−1, which produces the points projected positions into frame N. The projection error for each point is the difference between the projected position of a point and the actual position of the point's matched feature in frame N.

This information is used to determine whether a feature was moving in the same direction or in a different direction than the dominant motion. Some embodiments maintain the projection error of each feature point for the previous frame only. Other embodiments maintain the projection error of each feature point for more than one previous frame. In these embodiments, data structure 1800 for each feature point is a two dimensional array.

Figure 19:
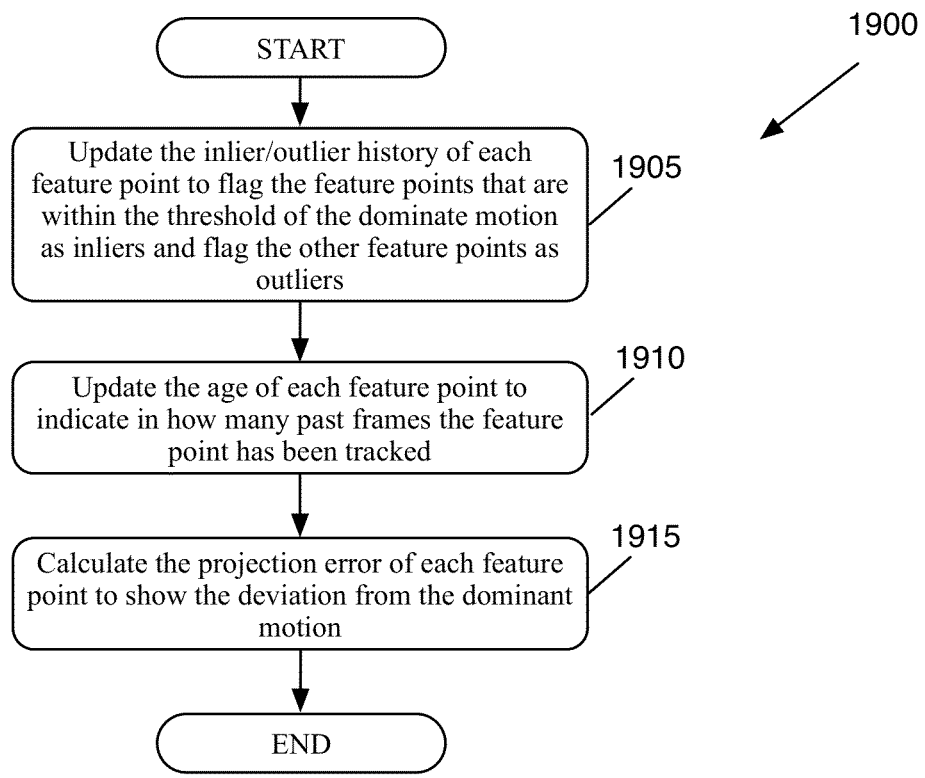
FIG. 19 conceptually illustrates a process for storing and updating historical metrics for feature points in some embodiments of the invention.

FIG. 19 conceptually illustrates a process 1900 for storing and updating historical metrics for feature points in some embodiments of the invention. Process 1900 is activated for instance by process 1300 (at 1375) to update the historical metrics for each feature point. As shown, process 1900 updates the inlier/outlier history (e.g., data structure 1600 shown in FIG. 16) by setting the bit value to 1 (or 0) for a feature point if the feature point is identified as an inlier and to 0 (or 1) if the feature point is identified as an outlier. When the data structure is filled with data (e.g., the historical data has already been collected for the past 64 frames in the example of FIG. 16) the bits in the data structure are shifted by one space before the information for the current frame is written in the data structure. A data structure similar to data structure 1600 is maintained for each feature point identified in a frame.

Next, process 1900 updates (at 1910) the age of the feature point. When a feature point is identified for the first time in a frame, the age is set to 1 and is incremented by 1 each time the feature point is matched to a feature point in a future frame. A data structure similar to data structure 1700 is maintained for each feature point identified in a frame.

The process then calculates (at 1915) the projection error of each feature point to show the deviation from the inter frame dominant motion. The process then ends. A data structure similar to data structure 1800 is maintained for each feature point identified in a frame. Some embodiments maintain the projection error of a feature point over several frames. In these embodiments, data structure 1800 for each feature point is an array of data to store projection error over of the feature point multiple frames.

F. Optimization

Figure 20:
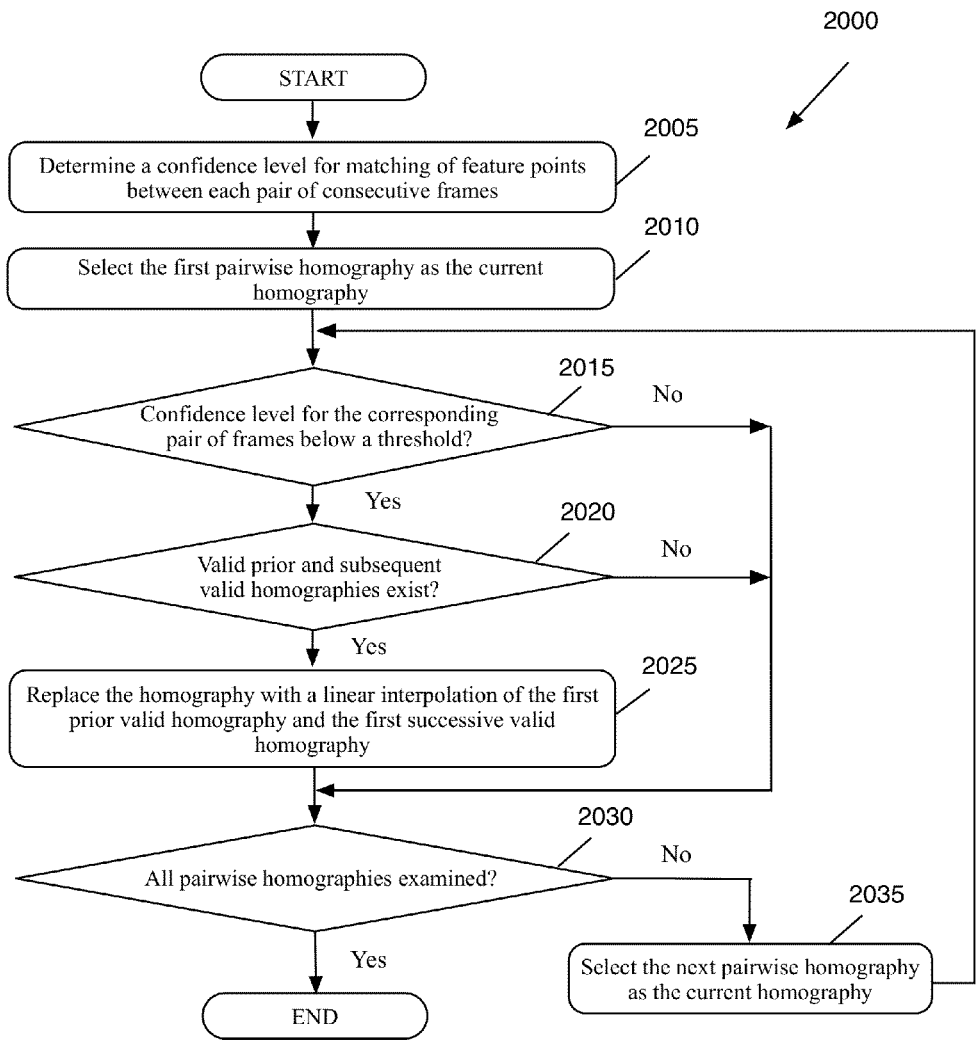
FIG. 20 conceptually illustrates a process for performing optimization on homographies in some embodiments of the invention.

Some embodiments perform optimization after all homographies between each pair of consecutive video frames are identified. FIG. 20 conceptually illustrates a process 2000 for performing optimization on homographies in some embodiments of the invention. As shown, the process determines (at 2005) a confidence metric (e.g., in the range of 0 to 1) for the matching of the feature points between each two frames consecutive frames. In some embodiments, the metric is a function of how many features are matched between the two frames and how many prior inliers continue to be inliers. The metric can also be based on other metrics, such as the geometric properties of the homography's reprojection and the total area of the frame occupied by inlier feature points. The metric provides an approximation of how likely the match is to be a good description of the motion.

The process then selects (at 2010) the first pairwise homography as the current homography. The process then determines (at 2015) whether the confidence level for the corresponding pair of frames is below a predetermined threshold. If not, the process proceeds to 2030, which is described below. Otherwise, when the confidence level is below the threshold, the process determines (at 2020) whether prior and subsequent valid homographies exist. If not, the process proceeds to 2030, which is described below.

Otherwise, the process replaces (at 2025) the current homography with a linear interpolation of the first prior valid homography and the first successive valid homography in time. The process then determines (at 2030) whether all pairwise homographies are examined. If yes, the process ends. Otherwise, the process selects (at 2035) the next homography as the current homography. The process then proceeds to 2015, which was described above.

The analysis phase ends after the homographies are optimized. At the end of analysis phase, if there are M frames in the video sequence, there will be M−1 homographies, one for each pair of consecutive frames.

II. Stabilization

A. Removing Unwanted Motion

Figure 21:
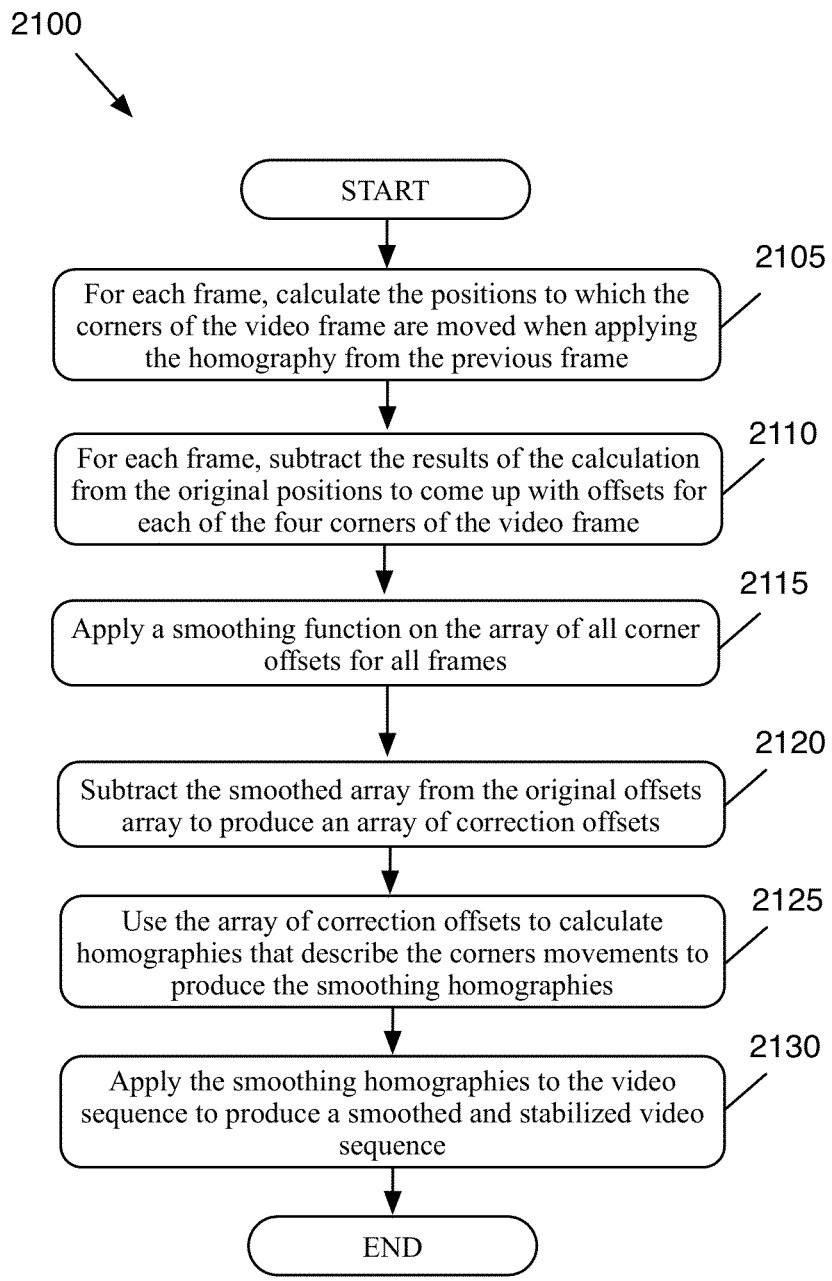
FIG. 21 conceptually illustrates a process for smoothing a sequence of video frames in some embodiments of the invention.

The analysis phase provides a complete chain of homographies between all frames. Some embodiments calculate a smoothed chain of correction homographies. In some embodiments, the amount of smoothing is a scalar user specified parameter, which sets how aggressively the noisy space-time motion trajectory is smoothed/filtered. FIG. 21 conceptually illustrates a process 2100 for smoothing a sequence of video frames in some embodiments of the invention. The process, for each video frame, calculates (at 2105) the positions to which the corners of the frame are moved when applying the homography from the previous frame. The process then subtracts (at 2110) the results of the calculation from the original positions to come up with an array of offset points that includes offsets (or deltas) for each of the four corners of each video frame.

The process then smooths the offsets of each corner of a frame by applying (at 2115) a smoothing function to the corner offset of the frame and the corresponding corner offsets of a group of previous and subsequent frames. For instance, some embodiments utilize a kernel length of 60 frames with 30 frames before and 30 frames after the current frame. When there are not enough frames either before or after a frame, some embodiments utilize a kernel with fewer numbers of frames. Some embodiments utilize a Gaussian smoothing function as the function to smooth the array of offset points.

Figure 22:
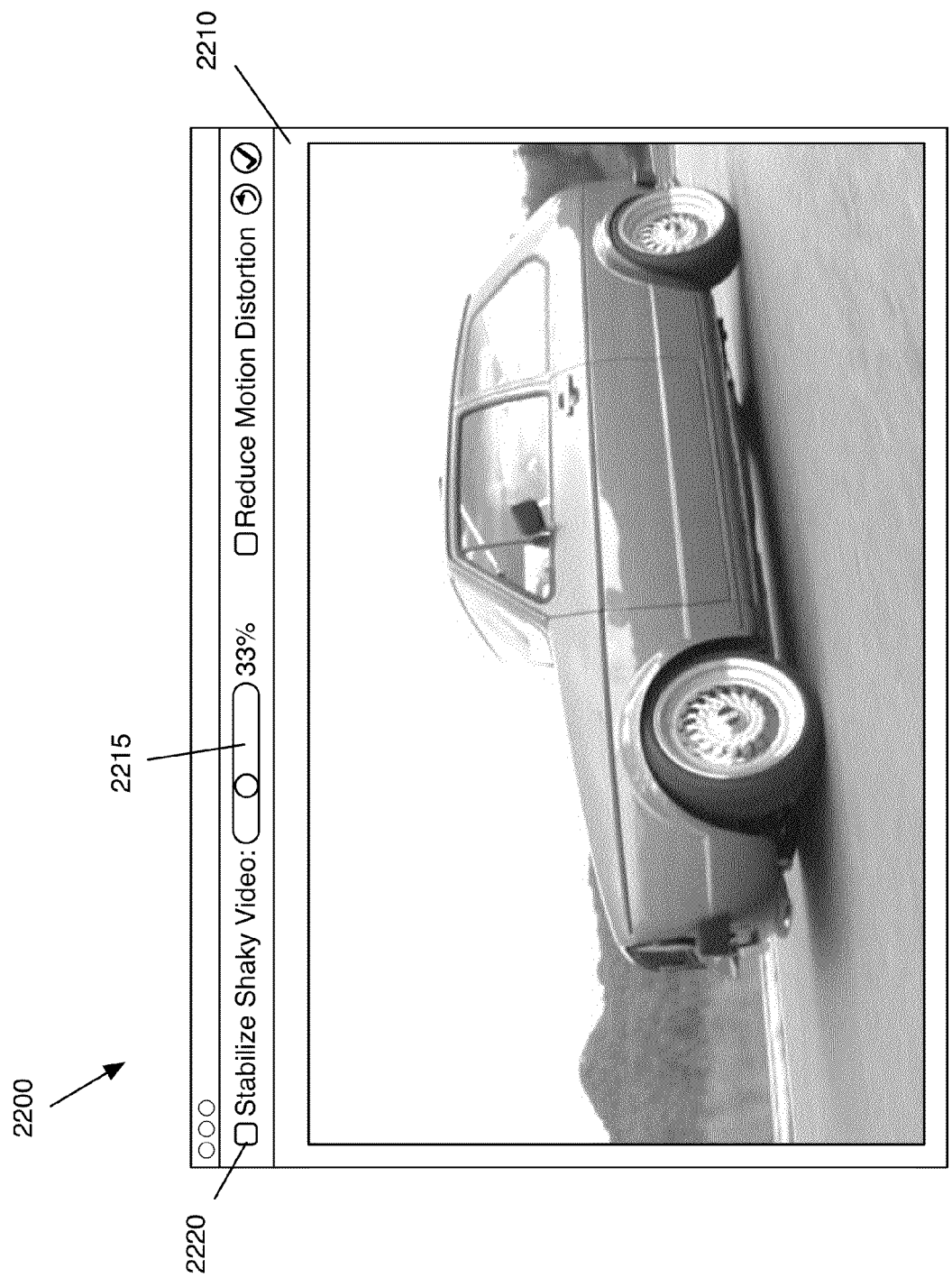
FIG. 22 conceptually illustrates a portion of a user interface for adjusting the amount of smoothing in some embodiments of the invention.

In some embodiments, the amount of smoothing performed is based on a user selectable parameter. FIG. 22 conceptually illustrates a portion 2200 of a user interface for adjusting the amount of smoothing in some embodiments of the invention. As shown, the user interface includes a display area 2210 for playing video or displaying individual frames of a video sequence.

The user interface includes a control 2215 for adjusting the amount of smoothing for the video sequence. The user interface also includes a control 2220 for enabling and disabling of video stabilization. The slider control 2215 is used to indicate the amount of smoothing. In this example, the slider indicates a value from 0-100%, which in this particular embodiment corresponds to a range of 0-6 seconds of range of the Gaussian smoothing of the corner positions of the frame. In other embodiments, the user interface includes a text for specifying the range in seconds for frames to be used in the Gaussian smoothing function.

Referring back to FIG. 21, the process then subtracts (at 2120) the smoothed offset array from the original offset array to produce an array of correction offsets. The process then uses the array of correction offsets to calculate (at 2125) homographies that describe the corner movements to produce the smoothing homographies. The process then applies (at 2130) the smoothing homographies to the video sequence to produce a smooth and stabilized video sequence.

In addition to removing the effects of shaking of the camera, the disclosed geometrically biased historically weighted RANSAC approach reduces the rolling shutter effects. Rolling shutter is a method of image capture where each frame is recorded not from a snapshot taken at a single point in time, but rather by scanning across the frame either vertically or horizontally.

Because rolling shutter distortion is caused by high frequency motion (typically caused by camera shake) and the disclosed motion model can accommodate for the distortions, the smoothing model not only reduces the high-frequency motion to smooth the video, it also reduces the high-frequency changes in distortion that are caused by rolling shutter.

Figure 23:
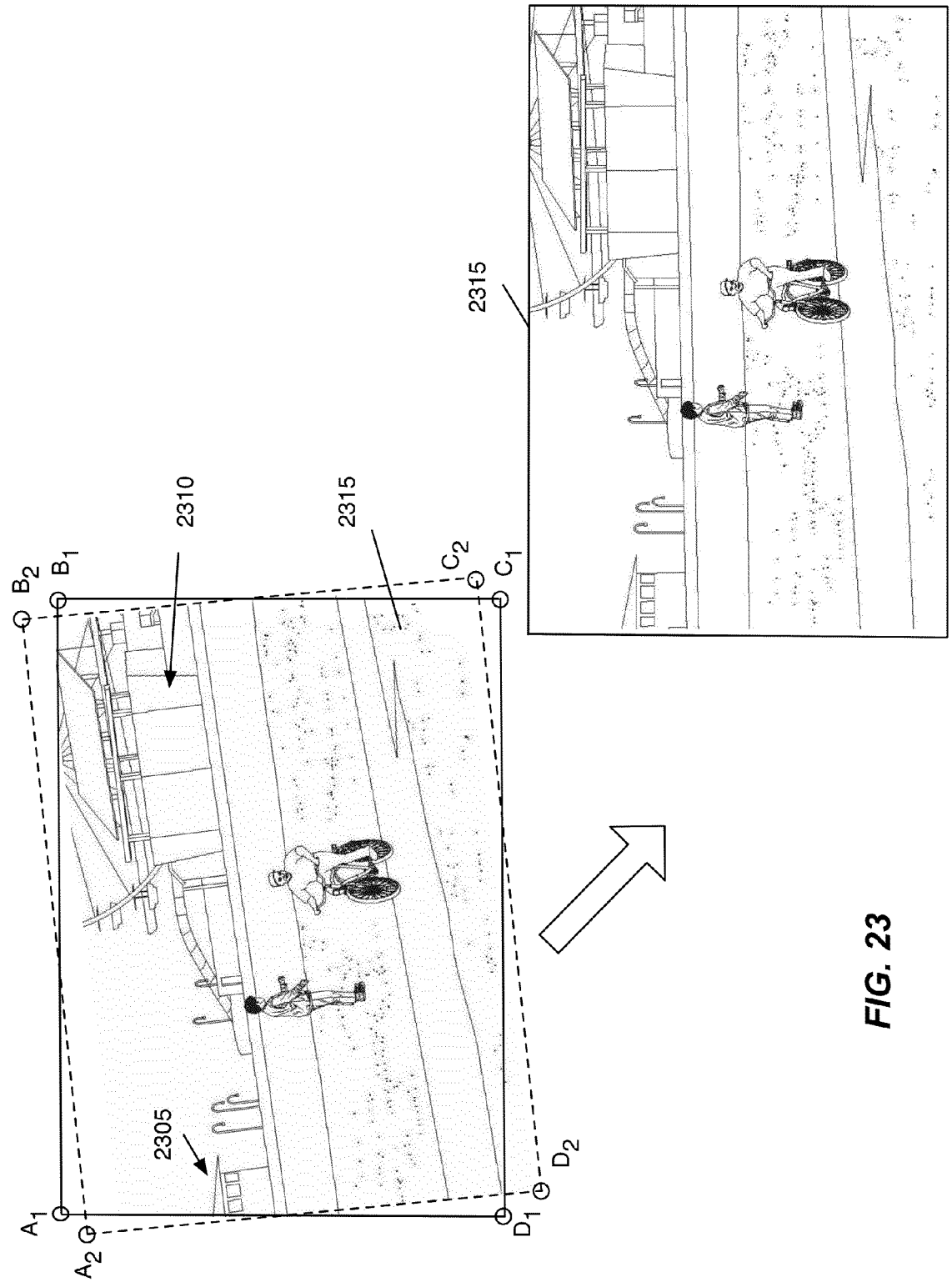
FIG. 23 conceptually illustrates the smoothing operations applied to a frame in some embodiments of the invention.

FIG. 23 conceptually illustrates the smoothing operations applied to a frame in some embodiments of the invention. As visually can be seen from the position of the building 2305 on the left side of the image in relation to the building 2310 on the right side of the image in frame 2390, the image captured by the camera is tilted to one side (e.g., due to shaking of the camera). The original positions of the four corners of the image are labeled as $A_1$, $B_1$, $C_1$, and $D_1$.

The calculated position of the corners to which the corners of the video frame are moved when applying the homography from the previous frame are labeled as $A_2$, $B_2$, $C_2$, and $D_2$. As shown, the effects of the camera shake are removed from the smoothed frame 2315 after operation 2130 of process 2100 is performed on the image.

In some embodiments, the video sequence is cropped to an inside rectangle. In other embodiments, instead of cropping, the blank portion of each image is filled in by using the information from other frames (e.g., the neighboring frames) or by extrapolating parameter information from points from the adjacent areas of the image. The technique is sometimes referred to as in-painting.

B. Tripod Mode

The smoothing embodiments described above, smooths the perceived motion of the camera through the frame. Some embodiments provide a different technique that removes all camera-related motion from the sequence as if the camera is on a tripod. In order to chain back the product of the homographies, some embodiments select a key frame in the video sequence, calculate difference between all corners for any other frame and the corresponding corner of the key frame. The differences are used to map all frames to the key frame homography to delete all motion related to the dominant motion of the video sequence. In other words, all point positions of inliers are reprojected to the key frame's coordinate system (by producing a product of consecutive homography matrices).

This operation is conceptually similar to stacking up all the frames. In some embodiments, the video sequence is cropped to the inside rectangle. In other embodiments, instead of cropping, the blank portion of each image is filled in by using the information from other frames or by extrapolating the points of the adjacent areas of the image.

Figure 24:
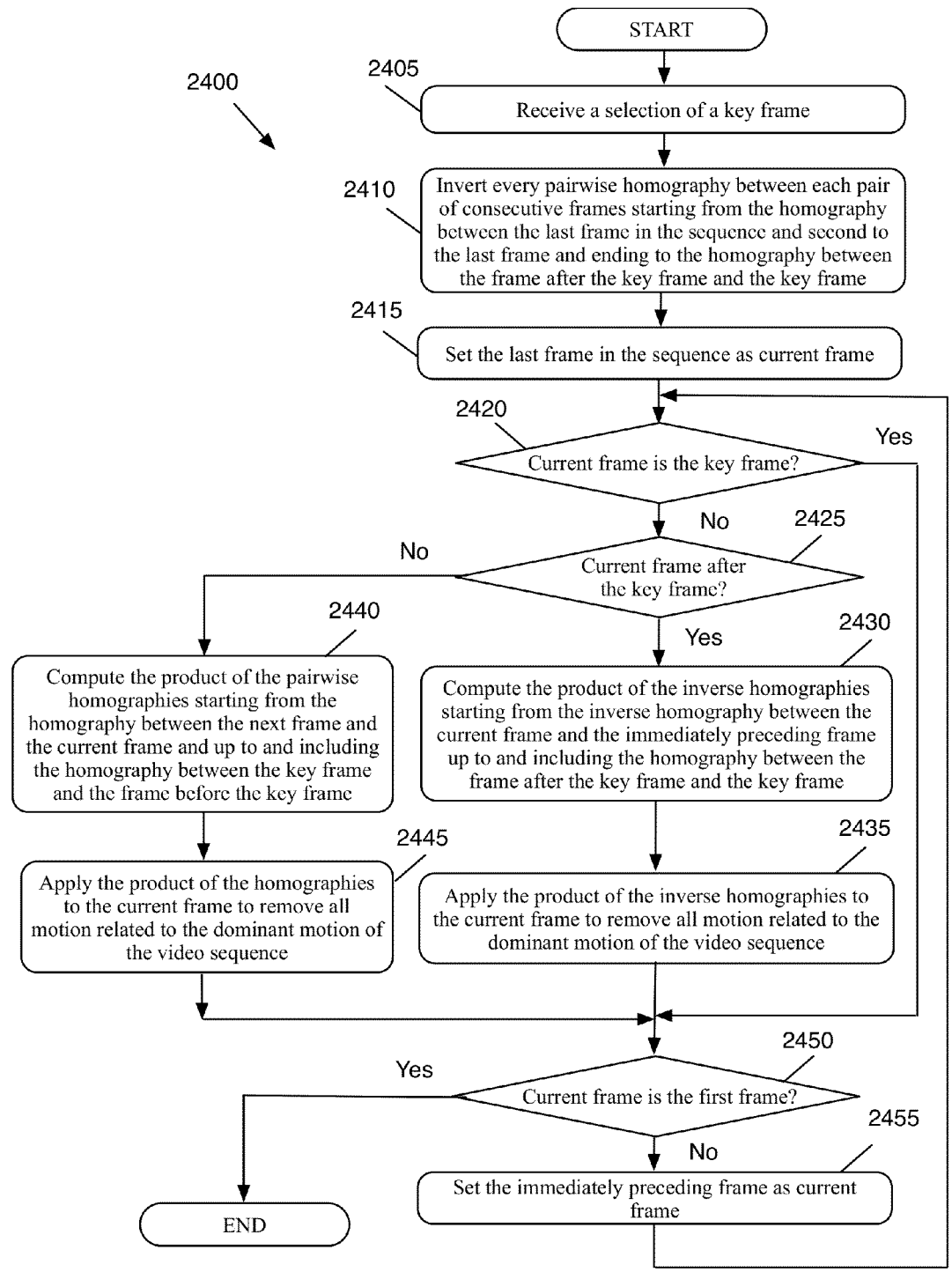
FIG. 24 conceptually illustrates a process for stabilizing a video sequence in some embodiments of the invention.

FIG. 24 conceptually illustrates a process 2400 for stabilizing a video sequence in some embodiments of the invention. As shown, the process receives (at 2405) a selection of a key frame in the video sequence. The key frame can be any frame in the sequence. For instance, the key frame can be a frame that has the most relevant subject matter of the video sequence. The key frame can also be a frame that has optimal framing, optimal camera orientation, etc. The key frame can also be the initial frame or any randomly selected frame.

Figure 25:
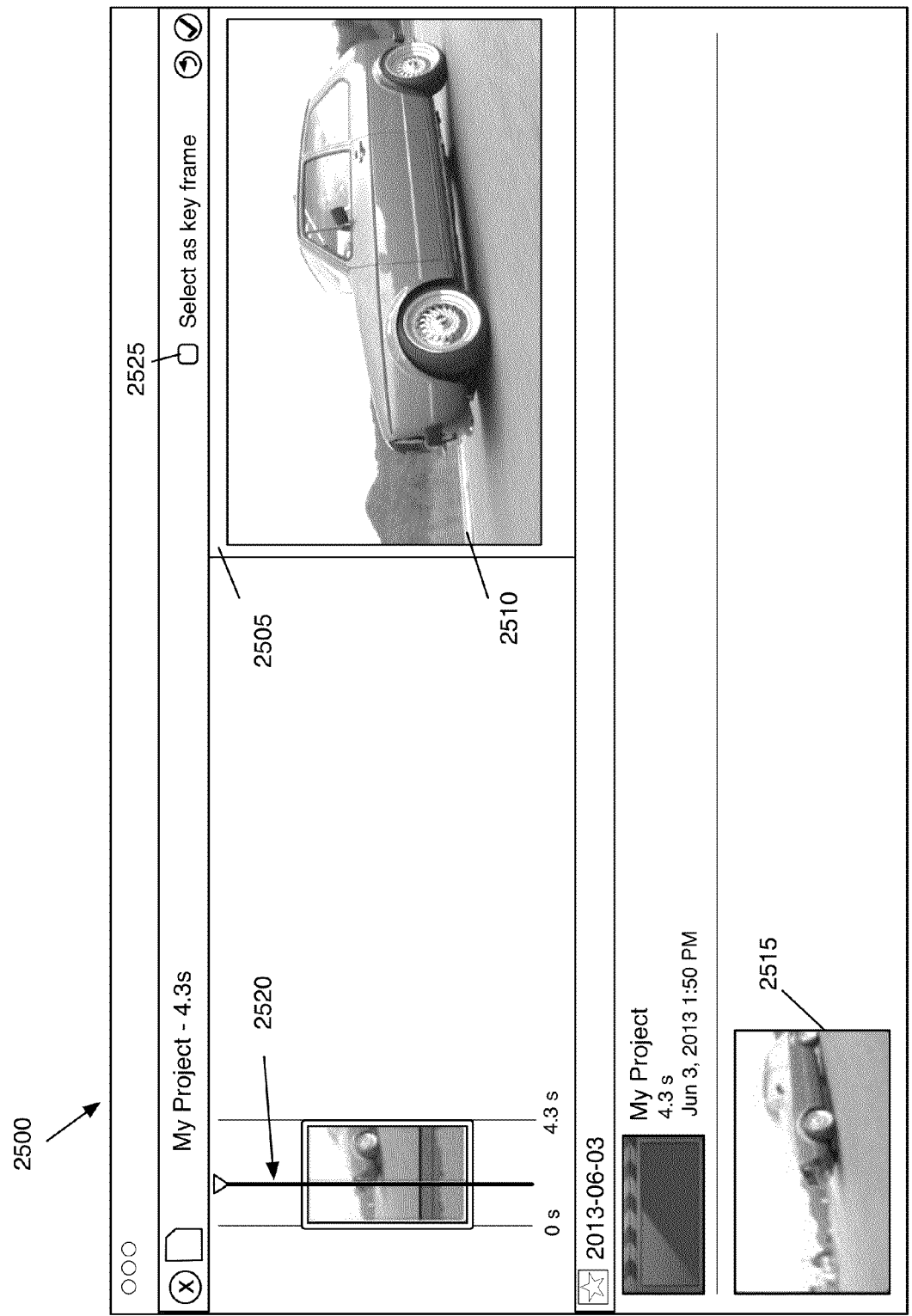
FIG. 25 conceptually illustrates a portion of a user interface for selecting a key frame for tripod mode video stabilization in some embodiments of the invention.

FIG. 25 conceptually illustrates a portion 2500 of a user interface for selecting a key frame for tripod mode video stabilization in some embodiments of the invention. The user interface includes a display area 2505 for displaying a selected frame 2510 of a video sequence (or video clip) 2515. The user interface also includes an indicator 2520 to show the relative position of the current frame 2510 in the video sequence.

The user can view different frames of the video sequence 2515 to identify a frame that the user wants to selects as the key frame. The user then selects the frame as the key frame for the tripod mode stabilization by selecting the control 2515.

Referring back to FIG. 24, the process then inverts (at 2410) every pairwise homography between each pair of consecutive frames starting from the homography between the last frame in the sequence and second to the last frame and ending to the homography between the frame after the key frame and the key frame. For instance if the key frame is the first frame then all pairwise homographies are inverted. On the other hand, if the key frame is the last frame, none of the homographies are inverted.

The process then sets (at 2415) the last frame in the sequence as the current frame. The process then determines (at 2420) whether the current frame is the key frame. If yes, the process proceeds to 2450, which is described below. Otherwise, the process determines (at 2425) whether the current frame is located after the key frame in the sequence of video frames. If not, the process proceeds to 2440, which is described below.

Otherwise, the process computes (at 2430) the product of the inverse homography matrices starting from the inverse homography between the current frame and the immediately preceding frame up to and including the homography between the frame after the key frame and the key frame. The process then applies (at 2435) the product of the inverse homographies to the current frame to remove all motion related to the dominant motion of the video sequence. The process then proceeds to 2450, which is described below.

When the current frame is located before the key frame in the sequence of video frames, the process computes (at 2440) the product of the pairwise homography matrices starting from the homography between the next frame and the current frame and up to and including the homography between the key frame and the frame before the key frame. The process then applies (at 2445) the product of the homographies to the current frame to remove all motion related to the dominant motion of the video sequence.

The process then determines (at 2450) whether the current frame is the first frame in the video sequence. If yes, the process ends. Otherwise, the process sets (at 2455) the frame immediately preceding the current frame as the current frame. The process then proceeds to 2420, which is described above. Although process 2400 is described to start from the last frame in the sequence in operation 2415 and ends to the first frame in the sequence when operation 2450 is true, a person of ordinary skill in the art will realize that the process can be implemented by starting from the first frame in the sequence and ending to the last frame in the sequence.

III. Electronic System

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
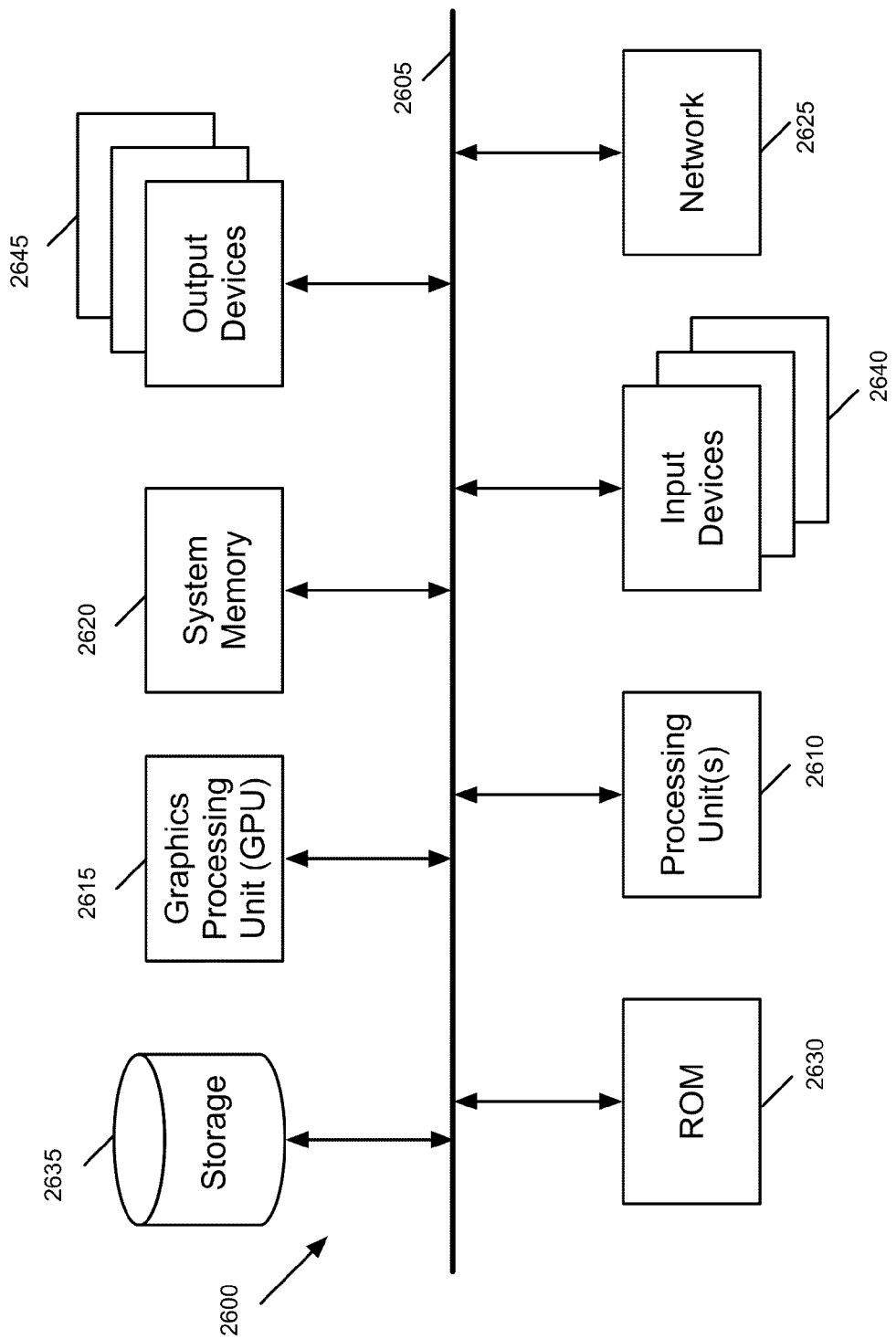
FIG. 26 conceptually illustrates an electronic system with which some embodiments of the invention are implemented.

FIG. 26 conceptually illustrates another example of an electronic system 2600 with which some embodiments of the invention are implemented. The electronic system 2600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2600 includes a bus 2605, processing unit(s) 2610, a graphics processing unit (GPU) 2615, a system memory 2620, a network 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the GPU 2615, the system memory 2620, and the permanent storage device 2635.

From these various memory units, the processing unit(s) 2610 retrieves instructions to execute and data to process in order to execute the processes of the invention. The processing unit(s) may be a single processor or a multi-core processor in different embodiments. Some instructions are passed to and executed by the GPU 2615. The GPU 2615 can offload various computations or complement the image processing provided by the processing unit(s) 2610.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive, integrated flash memory) as the permanent storage device 2635.

Other embodiments use a removable storage device (such as a floppy disk, flash memory device, etc., and its corresponding drive) as the permanent storage device. Like the permanent storage device 2635, the system memory 2620 is a read-and-write memory device. However, unlike storage device 2635, the system memory 2620 is a volatile read-and-write memory, such a random access memory. The system memory 2620 stores some of the instructions and data that the processor needs at runtime. In some embodiments, the invention's processes are stored in the system memory 2620, the permanent storage device 2635, and/or the read-only memory 2630. For example, the various memory units include instructions for processing multimedia clips in accordance with some embodiments. From these various memory units, the processing unit(s) 2610 retrieves instructions to execute and data to process in order to execute the processes of some embodiments.

The bus 2605 also connects to the input and output devices 2640 and 2645. The input devices 2640 enable the user to communicate information and select commands to the electronic system. The input devices 2640 include alphanumeric keyboards and pointing devices (also called "cursor control devices"), cameras (e.g., webcams), microphones or similar devices for receiving voice commands, etc. The output devices 2645 display images generated by the electronic system or otherwise output data. The output devices 2645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 26, bus 2605 also couples electronic system 2600 to a network 2625 through a network adapter (not shown). In this manner, the computer can be a part of a network of computers (such as a local area network ("LAN"), a wide area network ("WAN"), or an Intranet), or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 2A-2B, 8A-8C, 13A-13B, 19-21, and 24) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for removing unwanted camera motion from a video sequence comprising a plurality of video frames, the method comprising:
    matching a plurality of feature points between each pair of consecutive video frames in the video sequence;
    calculating the motion of each matched feature point between the corresponding pair of consecutive video frames;
    calculating a set of historical metrics for each feature point;
    for each pair of consecutive video frames, determining a homography defining a dominant motion between the pair of consecutive frames, the homography determined by performing a geometrically biased historically weighted random sample consensus (RANSAC) method on the calculated motion of the matched feature points between the pair of consecutive frames, the geometrically biased historically weighted RANSAC method using a cost function that gives a weight to the calculated motion of each feature point based on the set of historical metrics calculated for the feature point and includes a geometric component that biases a result of the RANSAC method towards a solution that minimizes spatial distortion; and
    removing the unwanted camera motion from the video sequence using the determined homographies.

2. The method of claim 1 further comprising:
    identifying a set of feature points on each video frame; and
    describing each identified feature point on a frame in terms of differences between a set of parameters of a plurality of pairs of points neighboring the identified feature point,
    wherein matching a plurality of feature points between each pair of consecutive video frames in the video sequence comprises comparing the description of each feature point on a later frame of the pair with the description of a set of the feature points in the previous frame of the pair.

3. The method of claim 2, wherein the set of parameters comprises an intensity of a neighboring point.

4. The method of claim 1, wherein the set of historical metrics comprises an indication whether a feature point was a part of a previously identified plane of dominant motion between one or more prior pairs of consecutive video frames.

5. The method of claim 1, wherein the set of historical metrics comprises an indication of a number of prior frames where a feature point has been identified.

6. The method of claim 1, wherein the set of historical metrics comprises a projection error indicating how much a feature point deviated from a dominant motion in a previous frame.

7. The method of claim 1, wherein giving a weight to the calculated motion of each feature point based on the set of historical metrics comprises giving a higher weight to a first feature point than a second feature point, the first feature point being a part of the dominant motion between more pair of consecutive frames than the second feature point.

8. The method of claim 1, wherein removing the unwanted camera motion from the video sequence comprises:
    calculating smoothing homographies for a plurality of corners of each frame; and
    removing the unwanted camera motion by applying the smoothing homographies to the video sequence.

9. The method of claim 8, wherein calculating smoothing homographies comprises:
    calculating a first offset for each corner of each frame as a difference between an original position of each corner of a frame and a position to which the corners of the frame are moved when applying the homography determined between the frame and the previous frame;
    applying a smoothing function to the offsets calculated for each corner and offsets calculated for corners of a plurality of neighboring frames to calculate a smoothed second offset for each corner; and
    calculating smoothing homographies by subtracting each smoothed second offset from the corresponding first offset.

10. The method of claim 1, wherein removing the unwanted camera motion from the video sequence comprises:
    calculating smoothing homographies for a plurality of corners of each frame;
    inverting the smoothing homographies; and
    applying the inverted homographies to each frame to remove the unwanted camera motion.

11. A non-transitory machine readable medium storing a program for removing unwanted camera motion from a video sequence comprising a plurality of video frames, the program executable by at least one processing unit, the program comprising sets of instructions for:
    matching a plurality of feature points between each pair of consecutive video frames in the video sequence;

calculating the motion of each matched feature point between the corresponding pair of consecutive video frames;

calculating a set of historical metrics for each feature point;

determining, for each pair of consecutive video frames, a homography defining a dominant motion between the pair of consecutive frames, the set of instructions for determining the homography comprising a set of instructions for performing a geometrically biased historically weighted random sample consensus (RANSAC) method on the calculated motion of the matched feature points between the pair of consecutive frames, the geometrically biased historically weighted RANSAC method using a cost function that gives a weight to the calculated motion of each feature point based on the set of historical metrics calculated for the feature point and includes a geometric component that biases a result of the RANSAC method towards a solution that minimizes spatial distortion; and removing the unwanted camera motion from the video sequence using the determined homographies.

12. The non-transitory machine readable medium of claim 11, the program further comprising sets of instructions for:

identifying a set of feature points on each video frame; and describing each identified feature point on a frame in terms of differences between a set of parameters of a plurality of pairs of points neighboring the identified feature point, wherein the set of instructions for matching a plurality of feature points between each pair of consecutive video frames in the video sequence comprises a set of instructions for comparing the description of each feature point on a later frame of the pair with the description of a set of the feature points in the previous frame of the pair.

13. The non-transitory machine readable medium of claim 12, wherein the set of parameters comprises an intensity of a neighboring point.

14. The non-transitory machine readable medium of claim 11, wherein the set of historical metrics comprises an indication whether a feature point was a part of a plane of dominant motion between one or more prior pairs of consecutive video frames.

15. The non-transitory machine readable medium of claim 11, wherein the set of historical metrics comprises an indication of a number of prior frames where a feature point has been identified.

16. The non-transitory machine readable medium of claim 11, wherein the set of historical metrics comprises a projection error indicating how much a feature point deviated from a dominant motion in a previous frame.

17. The non-transitory machine readable medium of claim 11, wherein the set of instructions for giving a weight to the calculated motion of each feature point based on the set of historical metrics comprises a set of instructions for giving a higher weight to a first feature point than a second feature point, the first feature point being a part of the dominant motion between more pairs of consecutive frames than the second feature point.

18. The non-transitory machine readable medium of claim 11, wherein the set of instructions for removing the unwanted camera motion from the video sequence comprises sets of instructions for:

calculating smoothing homographies for a plurality of corners of each frame; and removing the unwanted camera motion by applying the smoothing homographies to the video sequence.

19. The non-transitory machine readable medium of claim 18, wherein the set of instructions for calculating smoothing homographies comprises sets of instructions for:

calculating a first offset for each corner of each frame as a difference between an original position of each corner of a frame and a position to which the corners of the frame are moved when applying the homography determined between the frame and the previous frame;

applying a smoothing function to the offsets calculated for each corner and offsets calculated for corners of a plurality of neighboring frames to calculate an smoothed second offset for each corner; and calculating smoothing homographies by subtracting each smoothed second offset from the corresponding first offset.

20. The non-transitory machine readable medium of claim 11, wherein the set of instructions for removing the unwanted camera motion from the video sequence comprises sets of instructions for:

calculating smoothing homographies for a plurality of corners of a set of frames in the plurality of frames;

inverting the smoothing homographies; and applying the inverted homographies to each frame in the set of frames to remove the unwanted camera motion.

21. An apparatus comprising:

a set of processing units; and a non-transitory machine readable medium storing a program for removing unwanted camera motion from a video sequence comprising a plurality of video frames, the program executable by at least one of the processing units, the program comprising sets of instructions for:

matching a plurality of feature points between each pair of consecutive video frames in the video sequence;

calculating the motion of each matched feature point between the corresponding pair of consecutive video frames;

calculating a set of historical metrics for each feature point;

determining, for each pair of consecutive video frames, a homography defining a dominant motion between the pair of consecutive frames, the set of instructions for determining the homography comprising a set of instructions for performing a geometrically biased historically weighted random sample consensus (RANSAC) method on the calculated motion of the matched feature points between the pair of consecutive frames, the geometrically biased historically weighted RANSAC method using a cost function that gives a weight to the calculated motion of each feature point based on the set of historical metrics calculated for the feature point and includes a geometric component that biases a result of the RANSAC method towards a solution that minimizes spatial distortion; and removing the unwanted camera motion from the video sequence using the determined homographies.

22. The apparatus of claim 21, the program further comprising sets of instructions for:

identifying a set of feature points on each video frame; and describing each identified feature point on a frame in terms of differences between a set of parameters of a plurality of pairs of points neighboring the identified feature point, wherein the set of instructions for matching a plurality of feature points between each pair of consecutive video frames in the video sequence comprises a set of instructions for comparing the description of each feature point on a later frame of the pair with the description of a set of the feature points in the previous frame of the pair.

23. The apparatus of claim 22, wherein the set of parameters comprises an intensity of a neighboring point.

24. The apparatus of claim 21, wherein the set of historical metrics comprises an indication whether a feature point was a part of a plane dominant motion between one or more prior pairs of consecutive video frames.

25. The apparatus of claim 21, wherein the set of historical metrics comprises an indication of a number of prior frames where a feature point has been identified.

* * * * *